(12) United States Patent
Balandin

(10) Patent No.: US 9,716,299 B2
(45) Date of Patent: Jul. 25, 2017

(54) GRAPHENE BASED THERMAL INTERFACE MATERIALS AND METHODS OF MANUFACTURING THE SAME

(71) Applicant: The Regents of the University of California, Oakland, CA (US)

(72) Inventor: Alexander A. Balandin, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 570 days.

(21) Appl. No.: 14/062,784

(22) Filed: Oct. 24, 2013

(65) Prior Publication Data
US 2014/0120399 A1 May 1, 2014

Related U.S. Application Data

(60) Provisional application No. 61/718,495, filed on Oct. 25, 2012.

(51) Int. Cl.
| | |
|---|---|
| *H01M 10/60* | (2014.01) |
| *H01M 10/659* | (2014.01) |
| *H01M 2/10* | (2006.01) |
| *H01M 10/653* | (2014.01) |
| *H01M 10/052* | (2010.01) |

(52) U.S. Cl.
CPC ....... *H01M 10/659* (2015.04); *H01M 2/1016* (2013.01); *H01M 10/653* (2015.04); *H01M 10/052* (2013.01); *Y10T 29/49108* (2015.01)

(58) Field of Classification Search
CPC ............ H01M 10/052; H01M 10/653; H01M 10/659; H01M 2/1016; Y10T 29/49108
See application file for complete search history.

(56) References Cited

U.S. PATENT DOCUMENTS

| | | | |
|---|---|---|---|
| 2002/0100968 A1* | 8/2002 | Zuo .................. | H01L 23/427 257/715 |
| 2006/0241237 A1* | 10/2006 | Drzal .................. | C08K 7/00 524/495 |
| 2007/0125493 A1* | 6/2007 | Jang .................. | B29C 43/222 156/324 |
| 2007/0218353 A1* | 9/2007 | Straubel ............ | B60L 3/0046 429/120 |
| 2010/0000441 A1* | 1/2010 | Jang .................. | C09D 11/037 106/31.13 |

(Continued)

OTHER PUBLICATIONS

Yu, A., et al. "Enhanced Thermal Conductivity in a Hybrid Graphite Nanoplatelet—Carbon Nanotube Filler for Epoxy Composites", Advanced Materials, 20, pp. 4740-4744, Oct. 23, 2008.*

(Continued)

*Primary Examiner* — Emily Le
*Assistant Examiner* — Lilia V Nedialkova
(74) *Attorney, Agent, or Firm* — Knobbe, Martens, Olson & Bear LLP

(57) ABSTRACT

Thermal interface materials and methods of manufacturing the same are disclosed. The thermal interface material can include a matrix and a filler. The filler can include graphene and multilayer graphene disposed within the matrix. Alternatively, the thermal interface material can also include a matrix, a metallic filler, and a graphene filler.

40 Claims, 15 Drawing Sheets

(56) References Cited

U.S. PATENT DOCUMENTS

| | | | | |
|---|---|---|---|---|
| 2011/0122590 A1* | 5/2011 | Wilson | ............... | C08G 59/027 361/760 |
| 2012/0251381 A1* | 10/2012 | Bedworth | ............... | C09K 5/14 420/469 |
| 2013/0202832 A1* | 8/2013 | Kwan | ............... | C08K 3/04 428/36.9 |

OTHER PUBLICATIONS

Felba, J. "Thermally Conductive Nanocomposites", in "Nano-Bio-Electronic, Photonic and MEMS Packaging", Wong, C.P., Moon, K.-S., Li Y., Eds., Springer Science: New York, pp. 277-314, published 2010.*

Yu, A., et al. "Graphite Nanoplatelet—Epoxy Composite Thermal Interface Materials", The Journal of Physical Chemistry C Letters, vol. 111, pp. 7565-7569, published May 10, 2007.*

"Stycast 2850KT Epoxy Encapsulant with High Thermal Conductivity", Technical Data Sheet, Emerson & Cuming, 2005.*

Khan M.F. Shahil and Alexander A. Balandin, "Graphene-Multilayer Graphene Nanocomposites as Highly Efficient Thermal Interface Materials," *Nano Letters*, 12, 861-867 (2012).

Vivek Goyal and Alexander A. Balandin, "Thermal properties of the hybrid graphene-metal nano-micro-composites: Applications in thermal interface materials," *Applied Physics Letters*, 100, 073113-1 to 073113-4 (2012).

G. Xu, B. Guenin, and M. Vogel, "Extension of Air Cooling for High Power Processors," ITherm, 1, 186-193 (2004).

M. J. Rightley, J. A. Emerson, C.C. Wong, D. L. Huber, and B. Jakaboski, "Advancement in Thermal Interface Materials for Future High-Performance Electronic Applications: Part 1," *Sandia Report*, SAND2007-0417, Feb. 2007.

A. K. Geim, and K. S. Novoselov, "The rise of graphene," *Nat. Mater*. 6, 183-191, Mar. 2007.

* cited by examiner

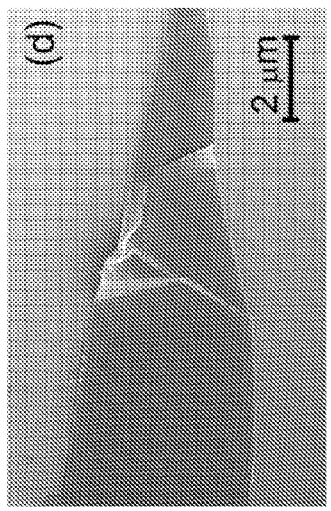
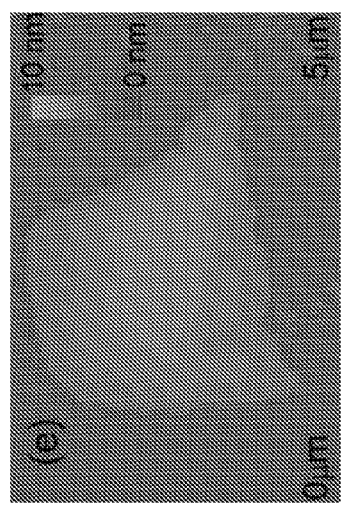
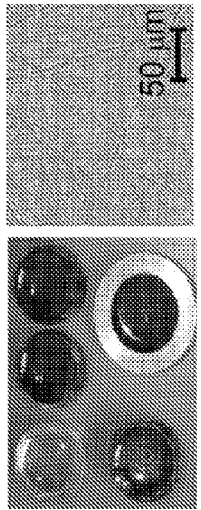
FIG. 3A  FIG. 3C  FIG. 3D  FIG. 3H
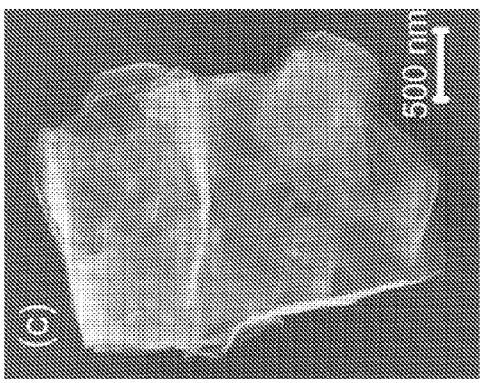
FIG. 3E
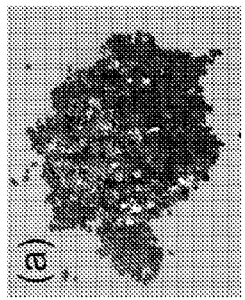
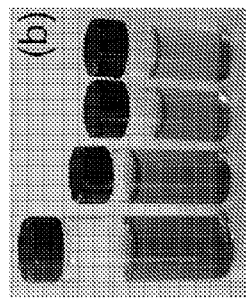
FIG. 3B  FIG. 3F  FIG. 3G
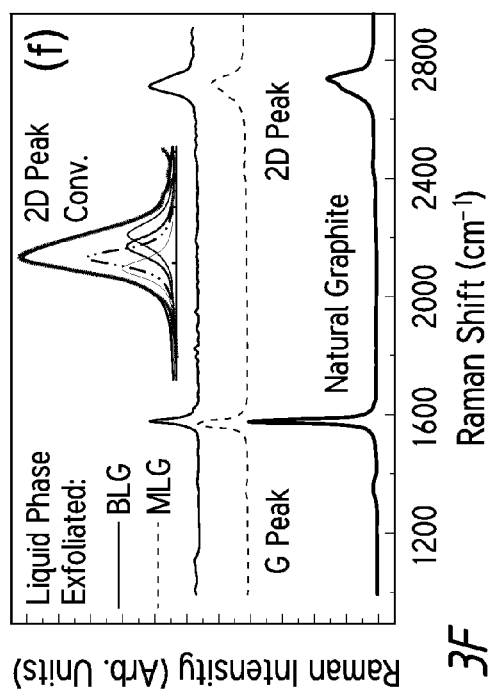

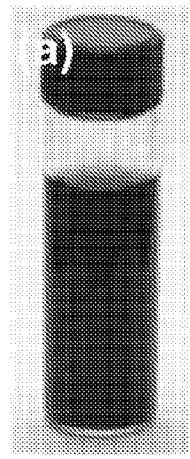 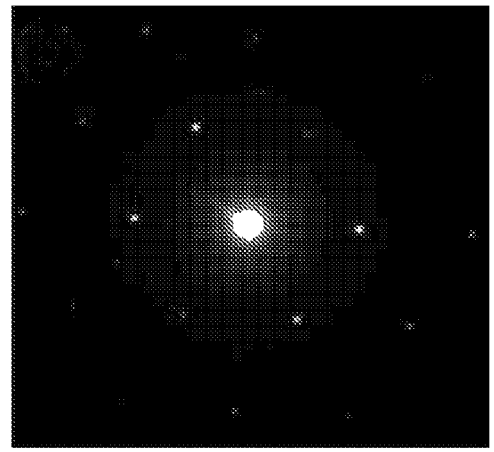
FIG. 17A          FIG. 17B
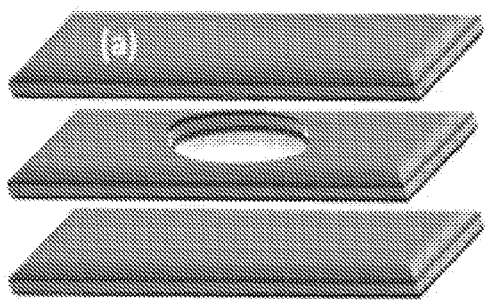 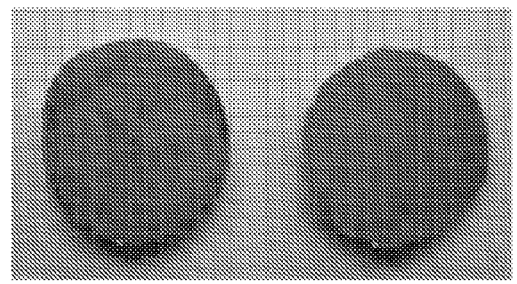
FIG. 18A          FIG. 18B

GRAPHENE BASED THERMAL INTERFACE MATERIALS AND METHODS OF MANUFACTURING THE SAME

CROSS-REFERENCE TO RELATED APPLICATIONS

This application claims the benefit of U.S. Provisional Patent Application No. 61/718,495, filed Oct. 25, 2012, which is incorporated in its entirety by reference herein.

BACKGROUND

Field of the Invention

This invention relates to the thermal interface materials (TIMs) used for heat removal in electronics, optoelectronics, photonics, and battery technology.

Description of the Related Technology

Rapidly increasing power densities in electronics make efficient heat removal an important issue for progress in information, communication and energy storage technologies. See, e.g., Balandin, *IEEE Spectrum*, 29, 35-39 (2009) and Garimella, S. V. et al., *IEEE Transactions on Components and Packaging Technologies*, 31, 801-815 (2008). Development of the next generations of integrated circuits (ICs), three-dimensional (3D) integration and ultra-fast high-power density communication devices can make the thermal management requirements extremely severe. See, e.g., Balandin, *IEEE Spectrum*, 29, 35-39 (2009); S. V. Garimella et al., *IEEE Transactions on Components and Packaging Technologies*, 31, 801-815 (2008); R. Prasher, *Proceedings of IEEE*, 94, 1571-1585 (2006); F. Sarvar et al., *Proceeds. Electronics System Integration Technology Conference* (IEEE 1-4244-0553), 2, 1292-1302 (2006); R. S. Prasher et al., *Intel Technology Journal*, 9, 285-296 (2005); and J. Felba, Thermally conductive nanocomposites, in *Nano-Bio-Electronic, Photonic and MEMS Packaging* (Springer Science, 2010; DOI 10.1007/978), Editors C. P. Wong, K.-S. Moon and Y. Li, 277-314 (2010). Efficient heat removal can become a critical issue for the performance and reliability of modern electronic, optoelectronic, photonic devices and systems. Thermal interface materials (TIMs), applied between heat sources and heat sinks, can be essential ingredients of thermal management. See, e.g., R. Prasher, *Proceedings of IEEE*, 94, 1571-1585 (2006); F. Sarvar et al. *Proceeds. Electronics System Integration Technology Conference* (IEEE 1-4244-0553), 2, 1292-1302 (2006); R. S. Prasher et al., *Intel Technology Journal*, 9, 285-296 (2005); and J. Felba, Thermally conductive nanocomposites, in *Nano-Bio-Electronic, Photonic and MEMS Packaging* (Springer Science, 2010; DOI 10.1007/978), Editors C. P. Wong, K.-S. Moon and Y. Li, 277-314 (2010). Conventional TIMs filled with thermally conductive particles require high volume fractions f of filler (f~50%) to achieve thermal conductivity K of the composite in the range of ~1-5 W/mK at room temperature (RT). Attempts of utilizing highly thermally conductive nanomaterials, e.g., carbon nanotubes (CNTs), as fillers in TIMs, have not led to practical applications due to weak thermal coupling at CNTs/base interface and prohibitive cost.

SUMMARY

Certain embodiments disclosed herein include a thermal interface material. The thermal interface material can comprise a matrix and a filler including graphene and multilayer graphene disposed within the matrix. The thermal interface material can comprise between about 0.5 volume percent to about 25 volume percent of graphene and multilayer graphene. In some embodiments, the multilayer graphene can have a thickness between about 0.35 nanometers to about 10 nanometers. In such embodiments, the multilayer graphene can have a thickness less than or equal to about 4 nanometers. In some embodiments, at least about 50% of the multilayer graphene can have a thickness less than or equal to about 2 nanometers or at least about 10% of the multilayer graphene can have a thickness less than or equal to about 1 nanometer. In some embodiments, about 90% of the multilayer graphene can have a lateral dimension within the range of about 25 nanometers to about 1 micrometer or about 10% of the multilayer graphene can have a lateral dimension greater than about 1 micrometer and less than or equal to about 10 micrometers.

In various embodiments, the filler further can comprise a metal. In addition, the matrix can comprise a polymer (e.g., an epoxy) or thermal grease. In some embodiments where the matrix comprises an epoxy, the material can have a thermal conductivity of at least about 2 W/mK at room temperature when the material comprises between about 0.5 volume % to about 25 volume % of graphene and multilayer graphene. For example, the material can have a thermal conductivity within the range of about 2 W/mK to about 10 W/mK at room temperature. In addition, in some such embodiments, the material can have a thermal conductivity enhancement of at least about 150% at room temperature. For example, the material can have a thermal conductivity enhancement within the range of about 150% to about 2500% at room temperature.

In some embodiments where the matrix comprises a thermal grease, the material can have a thermal conductivity of at least about 10 W/mK at room temperature when the material comprises between about 0.5 volume % to about 25 volume % of graphene and multilayer graphene. For example, in some such embodiments, the material can have a thermal conductivity within the range of about 10 W/mK to about 30 W/mK at room temperature.

Certain embodiments also disclose a method of manufacturing a thermal interface material. The method can comprise providing graphite in a liquid solution, ultrasonicating the solution, and centrifuging the ultrasonicated solution. Providing graphite in a liquid solution can comprise providing graphite powders in an aqueous solution of sodium cholate. Ultrasonicating the solution can comprise ultrasonicating between about 10 hours and about 15 hours. Centrifuging can comprise centrifuging at a centrifugation rate between about 5 K-rpm and about 20 K-rpm.

In various embodiments, the method can also include filtering the centrifuged solution, forming a filler comprising graphene and multilayer graphene from the centrifuged solution, and adding the filler with a matrix to form the thermal interface material. In some embodiments, forming the filler can comprise drying the filtered solution to form a suspension, dispersing the suspension in a liquid, ultrasonicating the liquid, and drying the liquid. Filtering the centrifuged solution can comprise decanting the upper layers of the centrifuged solution, and forming the filler can comprise forming the filler from the decanted layers. Drying the filtered solution or drying the liquid can comprise drying in a vacuum oven. In addition, dispersing the suspension can comprise dispersing the suspension in water. Furthermore, in some embodiments, adding the filler can comprise mixing the filler with a matrix material that forms into the matrix and heating the mixed matrix material.

Certain embodiments also disclose a thermal interface composite material comprising a matrix, a metallic filler, and a graphene filler. The material can comprise at least about 0.5 volume percent graphene filler or less than or equal to about 25 volume percent graphene filler. In some such embodiments, the thermal conductivity can be within a range of about 2 W/mK to about 15 W/mK at room temperature. In addition, the thermal conductivity can remain within the range of about 2 W/mK to about 15 W/mK for temperatures between about 5° C. and about 75° C. In some embodiments, the metallic filler can comprise silver and/or the matrix can comprise epoxy.

Certain embodiments also disclose a method of manufacturing a thermal interface material. The method can comprise providing a liquid graphene solution, dispersing the solution into a matrix material comprising metal particles, and heating the matrix material to form the thermal interface material. Dispersing the solution into the matrix material can comprise dispersing the solution ultrasonically in an epoxy loaded with the metal particles. In some such embodiments, the method can further comprise adding a hardener to the solution, and high shear mixing the solution. Heating the matrix material can cure the epoxy and/or remove remaining solvent and air bubbles.

Certain embodiments also disclose a battery configured to transfer heat outside the battery. The battery can include a battery pack. For example, the battery pack can include Li-ion. In various embodiments, the battery can further include graphene-based thermal interface material or thermal phase change material. The graphene-based thermal interface material can include the multilayer graphene or the thermal interface composite material comprising metallic and graphene fillers.

Furthermore, certain embodiments disclose a method of using graphene-based thermal interface materials for thermal management of battery packs. The method can include filling the battery pack with graphene-based thermal interface material or thermal phase change materials.

BRIEF DESCRIPTION OF THE DRAWINGS

FIG. 3 illustrates the synthesis and characterization of certain embodiments of graphene-multilayer graphene (MLG) polymer nanocomposite TIMs as described herein: (a) graphite source material; (b) liquid-phase exfoliated graphene and MLG in solution; (c) SEM image of MLG revealing overlapping regions and wrinkles, which can improve thermal coupling; (d) SEM image of a large MLG (n<5) flake extracted from the solution; (e) AFM image of MLG flake with varying n; (f) Raman spectroscopy image of bilayer graphene flakes extracted from the solution; (g) optical image of graphene-MLG polymer composite samples prepared for thermal measurements; and (h) representative SEM image of the surface of the resulting graphene based TIMs indicating small roughness and excellent uniformity of the dispersion.

FIG. 17 shows (a) an example optical image of graphene solution; and (b) an example electron diffraction pattern of the graphene sample showing crystallininty of graphene flakes.

FIG. 18 shows a schematic of (a) an example stainless steel mold; and (b) example silver epoxy/graphene molded disks.

DETAILED DESCRIPTION

Figure 1:
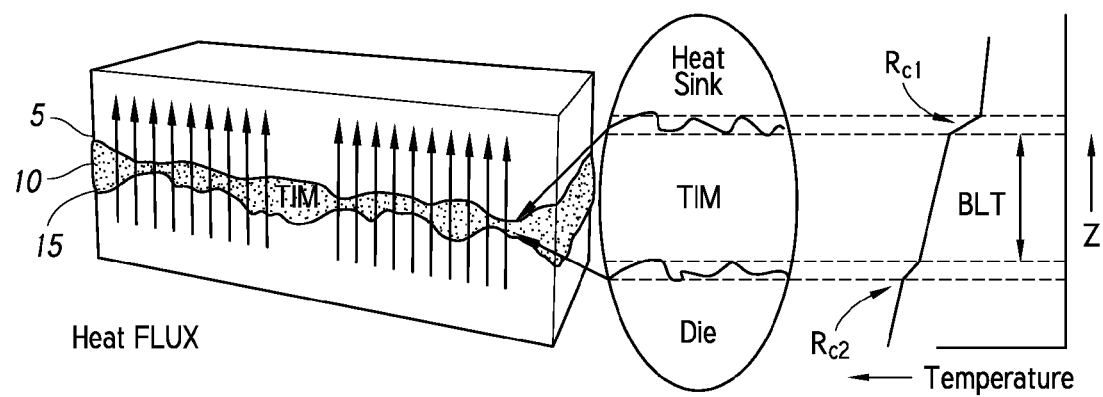
FIG. 1 is a schematic illustrating the action of thermal interface material, which fills the gaps between two contacting surfaces. The heat removal generally improves with higher thermal conductivity, smaller bond line thickness and contact resistance of the material.

Part A: Graphene and Multilayer Graphene Thermal Interface Materials and Methods of Making the Same Certain embodiments described herein relate to thermal interface materials. FIG. 1 is a schematic illustrating the action of an example thermal interface material 10, which fills the gaps between two contacting surfaces 5, 15. The function of the TIM 10 is generally to fill the voids and grooves created by imperfect surface finish of mating surfaces 5, 15. Its performance can be characterized by $R_{TIM}=BLT/K+R_{C1}+R_{C2}$, where BLT is the bond line thickness and $R_{C1}$, $R_{C2}$ are the contact resistance of the TIM 10 with the two bounding surfaces 5, 15. The magnitude of $R_{TIM}$ can depend on the surface roughness, interface pressure P, temperature T, and viscosity $\xi$.

The common TIMs are composites, which include a polymer matrix or base material and thermally conductive filler particles. TIMs generally have to be mechanical stable, reliable, non-toxic, low-cost and easy to apply. See, e.g., S. V. Garimella et al., *IEEE Transactions on Components and Packaging Technologies*, 31, 801-815 (2008); R. Prasher, *Proceedings of IEEE*, 94, 1571-1585 (2006); F. Sarvar et al., *Proceeds. Electronics System Integration Technology Conference* (IEEE 1-4244-0553), 2, 1292-1302 (2006); R. S. Prasher et al., *Intel Technology Journal*, 9, 285-296 (2005); and J. Felba, Thermally conductive nanocomposites, in *Nano-Bio-Electronic, Photonic and MEMS Packaging* (Springer Science, 2010; DOI 10.1007/978), Editors C. P. Wong, K.-S. Moon and Y. Li, 277-314 (2010). TIMs should generally possess as high K as possible, as well as low $\xi$ and coefficient of thermal expansion. The industrial TIMs have $R_{TIM} \sim 3\text{-}10 \times 10^{-6}$ $Km^2/W$. See, e.g., R. Prasher, *Proceedings of IEEE*, 94, 1571-1585 (2006). The drive to reduce filler particle size L of the conventional fillers, e.g., metal particles, has been explained by smaller L at high volume fraction f resulting in larger particle-to-particle contact area and lower $R_{TIM}$. See, e.g., J. Felba, Thermally conductive nanocomposites, in *Nano-Bio-Electronic, Photonic and MEMS Packaging* (Springer Science, 2010; DOI 10.1007/978), Editors C. P. Wong, K.-S. Moon and Y. Li, 277-314 (2010).

The efficiency of the filler in TIMs can be characterized by the thermal conductivity enhancement (TCE) defined as $\eta=(K-K_m)/K_m$, where K is thermal conductivity of the composite and $K_m$ is thermal conductivity of the matrix material. TCE of ~170% at the 50% loading of conventional fillers such as silver or alumina with the filler particle size L<10 μm can be considered as standard.

In general, heat removal improves with higher thermal conductivity K, and smaller bond line thickness BLT and contact resistance $R_{C1}$, $R_{C2}$ of the material. More efficient TIMs, which are used to minimize the thermal resistance between two surfaces can help to significantly lower the average and hot-spot temperatures in ICs, photovoltaic solar cells and batteries. Achieving enhancement of TIMs' thermal conductivity by a factor of 10-20 compared to that of the matrix materials can revolutionize not only electronics but also renewable energy generation where temperature rise in solar cells degrades the performance and limits life-time.

Carbon nanotubes (CNTs) attracted attention as potential fillers for TIMs. Their main attractive feature was extremely high intrinsic thermal conductivity $K_i$ in the range of ~3000-3500 W/mK at RT [11-12]. See, e.g., P. Kim et al., *Phys. Rev. Lett.* 87, 215502-4 (2001) and E. Pop et al., *Nano Lett.* 6, 1, 96-100 (2006). The outcomes of experiments with CNT-based TIMs were controversial. The measured TCE factors were moderate, in the range ~50-250% at f~7% of the CNT loading. See, e.g., A. Yu et al., *Appl. Phys. Lett.*, 89, 133102 (2006); P. Bonnet et al., *Appl. Phys. Lett.* 91, 201910 (2007); and S.U.S. Choi et al., *Appl. Phys. Lett.*, 79, 2252 (2001). In some cases, K was not improved substantially (see, e.g., P. Bonnet et al., *Appl. Phys. Lett.* 91, 201910 (2007)) or even decreased with addition of single-wall CNTs (see, e.g., A. Moisala et al., *Compos. Sci. Technol.* 66, 10, 1285-1288 (2006)). One explanation can be that although CNTs have excellent $K_i$, they do not couple well to the matrix material or contact surface. The reported thermal boundary resistance (TBR) between CNTs and polymer matrix was as high as $\sim 10^{-7}$ $m^2$ $KW^{-1}$. See, e.g., S. Huxtable et al., *Nat. Mater.* 2, 731-734 (2003). The large TBR at CNT/matrix interface can be attributed to a fundamental property—high Kapitza resistance (see, e.g., P. L. Kapitza, *J. Phys. USSR*, 4,181 (1941)) between one-dimensional (1D) CNTs and 3D bulk owing to the large difference in the phonon density of states (DOS). Also, the lack of thermal percolation in CNT composites might negatively affect their heat conduction properties. See, e.g., N. Shenogina et al., *Appl. Phys. Lett.*, 87, 133106 (2005). Interestingly, the electrical percolation thresholds $f_T$ for CNT composites are very low, f~0.1 vol. %, compared to 20-30 vol. % for composites with spherical fillers. See, e.g., J. Felba, Thermally conductive nanocomposites, in *Nano-Bio-Electronic, Photonic and MEMS Packaging* (Springer Science, 2010; DOI 10.1007/978), Editors C. P. Wong, K.-S. Moon and Y. Li, 277-314 (2010) and N. Shenogina et al., *Appl. Phys. Lett.*, 87, 133106 (2005). TIMs with aligned CNTs have better K, but suffer from large $R_C$ and prohibitive cost.

Figure 2:
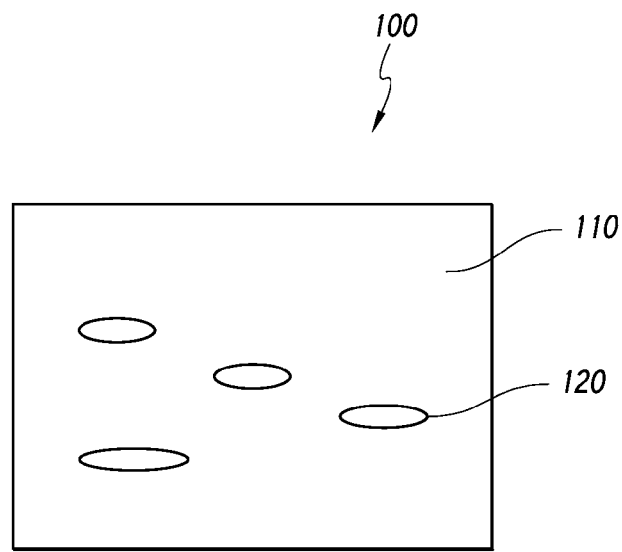
FIG. 2 is an example thermal interface material in accordance with certain embodiments described herein.

FIG. 2 is an example thermal interface material in accordance with certain embodiments described herein. The thermal interface material 100 includes a matrix 110 and a filler 120. The filler 120 can include graphene and multilayer graphene (MLG) disposed within the matrix 110. Certain embodiments allow significant improvement of the heat conduction properties. For example, a proper mixture of graphene and MLG produced by a high-yield liquid-phase-exfoliation (LPE) technique as described herein can be used for TIMs with the strongly enhanced cross-plane (through-plane) thermal conductivity K.

In certain embodiments, the matrix 110 can include any matrix material used for thermal interface materials. For example, in some embodiments, the matrix 110 can include a polymer, e.g., an epoxy, a silicone, polystyrene, or polymethyl methacrylate (PMMA). In other embodiments, the matrix 110 can include thermal grease, oil, or glycol and paraffin. Other matrix materials known in the art or yet to be developed can be used. As shown in FIG. 2, the matrix 110 can include a filler 120.

In various embodiments, the filler 120 includes graphene and MLG disposed within the matrix 110. The thermal interface material 100 can include less than or equal to about 50 volume % of the filler 120 (e.g., between about 0.5 volume % and about 40 volume %, between about 0.5 volume % and about 30 volume %, between about 0.5 volume % and about 25 volume %, between about 0.5 volume % about 20 volume %, between about 0.5 volume % and about 15 volume %, between about 0.5 volume % and about 10 volume %, or between about 0.5 volume % and about 5 volume % of the filler 120). As described herein, certain embodiments of the thermal interface material 100 can have improved heat conduction properties by only adding less than or equal to about 25 volume % (e.g., between about 0.5 volume % and about 15 volume %, between about 0.5 volume % and about 10 volume %, or between about 0.5 volume % and about 5 volume %) of the filler 120 including graphene and MLG.

In general, graphene is a single atomic plane of $sp^2$-bound carbon. Graphene has an extremely high intrinsic thermal conductivity $K_f$, which exceeds that of carbon nanotubes (CNTs). See, e.g., A. A. Balandin et al., C. N., *Nano Lett.* 8, 3, 902-907 (2008); D. L. Nika et al., *Phys. Rev. B* 79, 155413 (2009); S. Ghosh et al., *Nature Mat.* 9, 555-558 (2010); and A. A. Balandin, *Nature Mat.,* 10, 569-581 (2011). Multilayer graphene (MLG) retains good thermal properties. See, e.g., Ghosh, S. et al., A. A., *Nature Mat.* 9, 555-558 (2010) and Balandin, A. A, *Nature Mat.,* 10, 569-581 (2011). Graphite, which is 3D bulk limit for MLG with the number of layers n→∞), is still generally an excellent heat conductor with $K_f \approx 2000$ W/mK at RT. For comparison, $K_f \approx 430$ W/mK for silver and it is much lower for silver nanoparticles used in TIMs.

It can sometimes be difficult to distinguish between MLG and graphite films or between MLG and graphite nano-platelets (GnP). The distinction between MLG and thin film of graphite or bulk graphite can depend on the context as well as a particular application. Some, who focus on electrical properties, consider the material to be MLG rather than graphite as long as it is thin enough to have its carrier density tuned via the electrostatic gating, e.g., in the field-effect transistor type structures. In the thermal context, it is generally reasonable to consider the film to be MLG as opposed to graphite as long as its Raman spectrum is distinctively different from that of bulk graphite. The thermal properties of graphene and graphite at room temperature (RT) are typically dominated by the acoustic phonons. The optical phonons determine the Raman spectrum. In both cases, it is the crystal lattice dynamics that may define the difference between MLG and graphite. The Raman spectrum of MLG is often different from that of bulk graphite until the thickness H of approximately 7 to 10 atomic planes is reached. Thus, in some embodiments, it is typically reasonable to consider the materials to be MLG when its lattice dynamic-phonon-properties are substantially different from those of graphite (for example, H≤10 atomic planes or H≤3.5 nm).

MLG can also have much larger lateral dimensions (up to a few micrometers) than their thickness H. The GnP terminology may imply nano-particles made from graphite, which can be much thicker (for example, about 10-100 nm) than MLG. Accordingly, in some embodiments, compared to GnP, MLG can be considered to have a thickness less than about 10 nm. In addition, the lateral dimensions of GnP can be of the same order of magnitude as the thickness, e.g., the aspect ratio can be close to one. These factors can determine the differences in thermal properties between MLG and GnP. The Raman spectrum of MLG and GnP is often also different, which can attest to the differences in the lattice dynamic and thermal properties.

Although FIG. 2 schematically illustrates the filler 120 in the shape of an oval, the shape is not particularly limited. For example, the filler 120 can have a rectangular shape, a combination of various shapes, or an irregular shape. Additionally, the size of the filler 120 is not particularly limited. In general, the filler 120 can include graphene and MLG having a thickness H and a lateral dimension or size L, e.g., a length and/or a width.

In certain embodiments, graphene can have a thickness of approximately a single atomic plane of $sp^2$-bound carbon, e.g., about 0.35 nm. For example, the filler 120 can include graphene having a height between about 0.30 nm to about 0.40 nm. In addition, the lateral dimension L of graphene is not particularly limited. For example, in some embodiments, the filler 120 includes graphene having an L between about 0.30 nm to about 0.40 nm.

The filler 120 also can include MLG. The thickness H (=h×n, where h=about 0.35 nm can be the thickness of graphene monolayer) and size L distribution of MLG in the nanocomposites can be important for maximizing η. Certain embodiments can be referred to as nanocomposites because a substantial portion of the filler particles has at least one dimension (e.g., thickness) below a few nanometers in size. The presence of these nanoscale components can be essential for the materials' functionality in certain embodiments.

For example, in various embodiments, the MLG can have a thickness between the thickness of a graphene monolayer and the thickness of GnP (e.g., between about 0.35 nm to about 10 nm). Accordingly, in various embodiments, the MLG can have a thickness less than or equal to about 10 nm (e.g., about 9 nm, about 8 nm, about 7 nm, about 6 nm, or about 5 nm). In some embodiments, the MLG can have a thickness between the thickness of a graphene monolayer and the thickness of about 10 atomic planes or layers of graphene (e.g., between about 0.35 nm and about 3.5 nm). In such embodiments, the MLG can have a thickness less than or equal to about 4 nm or less than or equal to about 3.5 nm. For example, the MLG can have a thickness between about 0.35 nm and about 1 nm, between about 0.35 nm and about 2 nm, or between about 0.35 nm and about 3 nm.

Furthermore, the filler 120 can include a combination of MLG with different thicknesses. For example, about 50% or at least about 50% of the MLG can have a thickness between about 0.35 nm to about 2.5 nm (e.g., between about 1 and about 7 atomic planes), between about 0.35 nm to about 2 nm (e.g., between about 1 and about 6 atomic planes), between about 0.35 nm and about 1.5 nm (e.g., between about 1 and about 4 atomic planes), or between about 0.35 nm and about 1 nm (e.g., between about 1 and about 3 atomic planes). As other examples, about 10%, about 20%, about 30% or about 40% of the MLG can have a thickness between about 0.35 nm and about 2.5 nm (e.g., between about 1 and about 7 atomic planes), between about 0.35 nm and about 2 nm (e.g., between about 1 and about 6 atomic planes), between about 0.35 nm and about 1.5 nm (e.g., between about 1 and about 4 atomic planes), or between about 0.35 nm and about 1 nm (e.g., between about 1 and about 3 atomic planes). Various combinations are possible.

In various embodiments, the MLG can have an aspect ratio greater than or much greater than one. For example, the lateral dimension L for various MLG can be within the range of about 3.5 nanometers to about 10 micrometers (e.g., within the range of about 5 nanometers to about 10 micrometers or within the range of about 5 nanometers to about 5 micrometers). Furthermore, the MLG can include a combination of MLG with different lateral dimensions. For example, about 90% or at least about 90% of the MLG can have an L within the range of about 25 nanometers to about 1 micrometer (e.g., within the range of about 50 nanometers to about 0.5 micrometer). At least about 10% of the MLG can have an L greater than 1 micrometer and less than or equal to about 10 micrometers (e.g., between about 10% to about 15% of the MLG can have an L within the range of about 2 nanometers to about 5 micrometers). Various combinations are possible.

In further embodiments, the thermal interface material 100 can include other particles. For example, the thermal interface material 100 can also include metal particles. As another example, the thermal interface material 100 can also include other known filler particles, e.g., diamond, silica, or alumina.

As described herein, certain embodiments of the thermal interface material 100 can have improved heat conduction properties by adding less than or equal to about 25 volume % (e.g., less than or equal to about 15 volume %, less than or equal to about 10 volume %, or less than or equal to about 5 volume %) of the filler 120, e.g., the filler 120 including graphene and MLG. For example, in a matrix including epoxy, certain embodiments of the thermal interface material 100 with less than about 25 volume % (e.g., less than or equal to about 15 volume %, less than or equal to about 10 volume %, or less than or equal to about 5 volume %) of the filler having graphene and MLG can have a thermal conductivity of at least about 2 W/mK at room temperature. For example, the thermal conductivity can be within the range of about 2 W/mK to about 10 W/mK (e.g., within the range of about 2 W/mK to about 5 W/mK) at room temperature. In some embodiments, this can result in a thermal conductivity enhancement (TCE) of at least about 150% (e.g., at least about 170%) at room temperature. For example, the TCE can be within the range of about 150% to about 2500% (e.g., within the range of about 170% to about 2300%) at room temperature. As another example, in a matrix including thermal grease, certain embodiments of the thermal interface material 100 with less than about 25 volume % (e.g., less than or equal to about 15 volume %, less than or equal to about 10 volume %, or less than or equal to about 5 volume %) of the filler 120 having graphene and MLG can have a thermal conductivity of at least about 10 W/mK, at least about 15 W/mK, at least about 20 W/mK, or at least about 25 W/mK at room temperature. For example, the thermal conductivity can be between about 10 W/mK and about 30 W/mK at room temperature.

Example Embodiments

To test certain embodiments, the surfactant stabilized graphene dispersion method (see, e.g., Y. Hernandez et al., *Nature Nanotechnology* 3, 563-568 (2008); A. A. Green and M. C. Hersam, *Nano Lett.* 9, 12, 4031-4036 (2009); and M. Lotya et al., *J. Am. Chem. Soc.*, 131 (10), 3611-3620 (2009)) and graphene composite preparation techniques (see, e.g., S. Stankovich et al., *Nature* 442, 282-286 (2006) and D. Li et al., *Nature Nanotech.* 3, 101-105 (2008)) were adopted, with several modifications for maximizing TCE. In certain embodiments, the method uses relatively little chemical and thermal treatment. The dispersions were prepared by ultrasonication of graphite flakes in aqueous solution of sodium cholate followed by sonication and centrifugation. The optimum sonication time $t_s$ and centrifugation rate $r_c$ resulting in the largest $\eta$ were determined. Major advantages of the employed technique are the use of readily available graphite, low cost and scalability of production.

FIG. 3 illustrates the synthesis and characterization of certain embodiments of graphene-multilayer graphene (MLG) polymer nanocomposite TIMs as described herein: (a) graphite source material; (b) liquid-phase exfoliated graphene and MLG in solution; (c) SEM image of MLG revealing overlapping regions and wrinkles, which can improve thermal coupling; (d) SEM image of a large MLG (n<5) flake extracted from the solution; (e) AFM image of MLG flake with varying n; (f) Raman spectroscopy image of bilayer graphene flakes extracted from the solution; (g) optical image of graphene-MLG polymer composite samples prepared for thermal measurements; and (h) representative SEM image of the surface of the resulting graphene based TIMs indicating small roughness and excellent uniformity of the dispersion.

Micro-Raman spectroscopy was used to verify n. See, e.g., I. Calizo et al., *J. Appl. Phys.* 106, 043509 (2009). The n counting with the Raman spectroscopy can be efficient for n<7. For thicker flakes the thickness distribution statistics was also derived from AFM inspection. FIG. 3 (*f*) shows an example of Raman spectra of an example MLG from the solution and the reference graphite source excited at $\lambda$=488 nm. Deconvolution of 2D band and comparison of the I(G)/I(2D) intensity ratio allowed determination of n with a high accuracy, e.g., the plotted spectra correspond to the large-size bilayer graphene BLG (n=2) and MLG with n≈5. The weak intensity of the disorder D peak, composed of the $A_{1g}$ zone-edge phonons, indicates the large size and low defect concentration. The diameter of the laser spot in the micro-Raman spectroscopy was ~1 μm. The graphene-MLG concentrations utilized for preparation of the nanocomposite TIMs were ~0.253 mg/mL ($t_s$≈12 hrs, $r_c$=15 K-rpm). From the statistical analysis, for this example, the composites with ~10-15% of MLG with n≤2, ~50% of MLG with n≤5 were the optimum for maximizing $\eta$. Based on the optical microscopy and SEM examination, most of the graphene and MLG flakes (~90%) had lateral dimensions in the range L≈50 nm-0.5 μm. A small fraction of the flakes (~10%), predominantly with n<5, had large lateral sizes L≈2-5 μm. As discussed herein, their presence in the composites can be important in certain embodiments. The prepared nanocomposite graphene-MLG solutions were mixed with epoxy followed by curing and heating in vacuum to produce a large number of samples with the carbon loading f~0.2-10 vol. %. The homogeneity of the resulting composite and adhesive bonding have been verified with SEM. The example graphene-MLG fillers were substantially different from what is referred to as graphite nanoplatelets (GnP) characterized by higher thickness (about 10-100 nm).

Thermal conductivity measurements were conducted with the "laser flash" technique (NETZSCH). In the laser flash method, for a given geometry of the samples, heat propagates from the top to the bottom surface of the material under test. Accordingly, the measured K can be more closely related to the cross-plane (through plane) component of the thermal conductivity tensor. In certain embodiments, the cross-plane K is the one, which can be important for TIMs' performance. The sample thicknesses were about 1-1.5 mm so that their thermal resistances could be much larger than the contact resistance. As a control experiment, thermal conductivity of pristine epoxy was measured and obtained K=0.201 W/mK at RT, in agreement with the epoxy vendor's specifications.

Figure 4B:
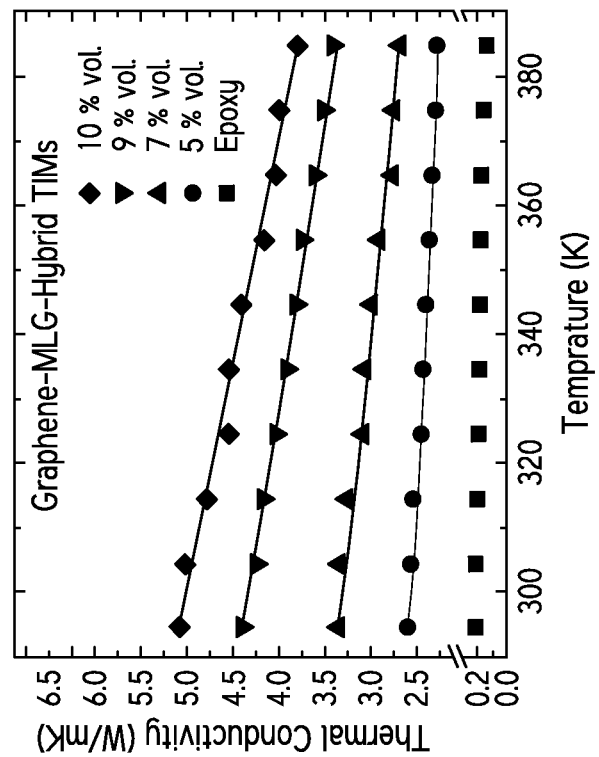
FIG. 4 illustrates the thermal conductivity enhancement in certain embodiments of graphene-MLG-nanocomposite epoxy TIMs as described herein. (a) Measured thermal conductivity enhancement factor as a fraction of the filler volume loading fraction. Note an extremely large enhancement of ~2300% at f=10 vol. % for the example nanocomposite. (b) Experimentally determined dependence of thermal conductivity of TIMs on temperature for different loading fractions.
Figure 4A:
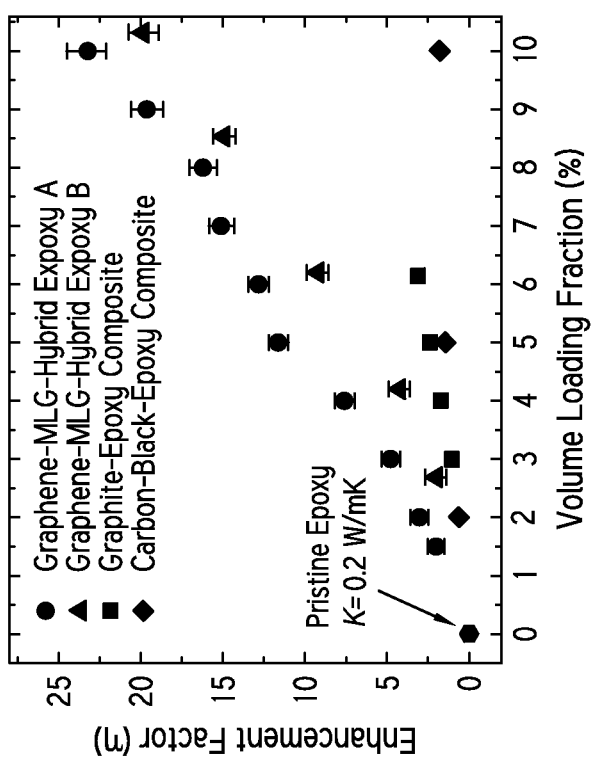

FIG. 4 (*a*) shows TCE factor as a function of f for the graphene-MLG-nanocomposite epoxy—sample A ($t_s$≈12 hrs, $r_c$=15 K-rpm) and sample B ($t_s$≈10 hrs, $r_c$=5 K-rpm) at RT. For comparison, TCE for the epoxy composites with graphite micro- and nanoparticles obtained by grinding the same graphite (substantial fraction of particles have L~40 μm) and for the epoxy composite with commercial carbon black (CB) powder were also measured. There is extraordinary increase in $\eta$ for the example graphene-MLG nanocomposites. At f=10 vol. % loading, K reaches the value of ~5.1 W/mK, which corresponds to TCE of ~2300%. Traditional fillers with small aspect ratios show TCE ~20% per 1 vol. % loading. The measured TCE for composites with the amorphous graphite particles were low and consistent with the literature. See, e.g., S. V. Garimella et al., *IEEE Transactions on Components and Packaging Technologies*, 31, 801-815 (2008); R. Prasher, *Proceedings of IEEE*, 94, 1571-1585 (2006); F. Sarvar et al. *Proceeds. Electronics System Integration Technology Conference* (IEEE 1-4244-0553), 2, 1292-1302 (2006); R. S. Prasher et al., *Intel Technology Journal*, 9, 285-296 (2005); and J. Felba, Thermally conductive nanocomposites, in *Nano-Bio-Electronic, Photonic and MEMS Packaging* (Springer Science, 2010; DOI 10.1007/978), Editors C. P. Wong, K.-S. Moon and Y. Li, 277-314 (2010). There were almost no TCE in CB-epoxy composites for the examined loading fractions. The control experiments with graphite particles and CB confirm that thermal properties of graphene and MLG can be essential for increasing K of TIMs in certain embodiments.

For certain embodiments, TCE follows approximately linear dependence on f without revealing any clear signature of thermal percolation threshold. One would expect to observe a kink in K(f) plot and $K=K_T[(f-f_T)/(1-f_T)]^\beta$ dependence (where $\beta \approx 2$ in 3D) if the percolation is resolved (f step is 1 vol. % in our measurements). The physics of thermal percolation has been a subject of intense debates. See, e.g., S. V. Garimella et al., *IEEE Transactions on Components and Packaging Technologies*, 31, 801-815 (2008); P. Bonnet et al., *Appl. Phys. Lett.* 91, 201910 (2007); N. Shenogina et al., *Appl. Phys. Lett.*, 87, 133106 (2005); and S. Stankovich et al., *Nature* 442, 282-286 (2006). Unlike electrical percolation, the thermal percolation threshold can be less pronounced due to heat conduction by the matrix. One can attempt to increase f of the graphene-MLG-polymer composites beyond 10 vol. % while maintaining acceptable TIM characteristics, e.g. $\xi$, $R_C$. In some embodiments, the changes in $\xi$ lead to inhomogeneous inclusions and surface roughness for f>10 vol. %. FIG. 4 (b) shows K as a function of T for different f in accordance with certain embodiments described herein. The K decrease with T at higher loading is reminiscent of the Umklapp phonon scattering characteristic for crystalline materials, including graphene. See, e.g., A. A. Balandin *Nature Mat.*, 10, 569-581 (2011). This suggests that heat may be carried by the thermally linked graphene or MLG flakes when f~10%. Contrary, in pristine epoxy the K(T) dependence is nearly absent, which is expected for the non-crystalline amorphous solids. See, e.g., id.

Further Embodiments

In order to evaluate the effectiveness of graphene-MLG-based TIMs in the practical setting of the two proximate surfaces and TIM between them, the thermal conductivity across the thermal contact was measured. Sandwiches of the two mating surfaces made of aluminum with the TIM in between two surfaces were prepared. First, starting with a commercial thermal grease as the TIM material which has Al and $ZnO_2$ particles as the filler materials (see, e.g., S. Narumanchi et al., NREL/CP-540-42972 Conference (2008)), the thermal conductivity of the stacked metal-grease-metal sandwiches was measured using the same laser flash technique. The thermal conductivity of the thermal grease determined in the experiments was ~5.8 W/mK, which compares well with the value provided by the vendor. As the next step, the grease was modified by adding a small quantity (f=2 vol. %) of an example mixture of graphene-MLG, and several sandwiches of the metal-TIM-metal were prepared. The thermal conductivity of the total structure was measured again following the same procedure. The extracted thermal conductivity of the graphene-MLG-grease TIM was found to be ~14 W/mK at RT. This corresponds to $K/K_m$ ratio of ~2.4, i.e. TCE factor of ~1.4, at the very small 2% loading fraction. Additional experiments have shown that the effective thermal conductivity of the resulting composite increases linearly with the graphene-MLG volume fraction at least till f=5 vol. % in certain embodiments. The latter indicates the thermal conductivity of the example graphene-MLG-grease TIM around ~26 W/mK. This value is higher than that in any commercial TIMs.

For comparison, in the case of the example graphene-MLG-epoxy composite the TCE factor is ~3 at 2% loading, which corresponds to $K/K_m$~4 (see FIG. 4 (a)). Although the TCE factor in the tested example commercial grease with graphene is smaller than that in the graphene-epoxy composite, it is still significant. It is reasonable to assume that in the commercial grease the TCE factor is smaller than in the graphene-MLG-epoxy nanocomposites owing to the presence of other filler particles (Al and $ZnO_2$) with the relatively low intrinsic K. A different graphene-matrix coupling can also affect the K value. The graphene-epoxy composites started with a much smaller matrix thermal conductivity $K_m$. A hybrid mixture of graphene-MLG and Al and $ZnO_2$ can be an efficient filler owing to a complex interactions among different filler particles. See, e.g., J. Felba, Thermally conductive nanocomposites, in *Nano-Bio-Electronic, Photonic and MEMS Packaging* (Springer Science, 2010; DOI 10.1007/978), Editors C. P. Wong, K.-S. Moon and Y. Li, 277-314 (2010).

By using ~2% loading fraction, the viscosity and other important mechanical characteristics, such as conformity and spreadability, of the original thermal grease were kept unaffected in certain embodiments. Conformability can allow TIM to fill the microscopic valleys on the surface of the mating surfaces, thus displacing air, which is thermally insulating. The spreadability can allow one to minimize the TIM thickness: the larger thickness can result in the higher thermal resistance in certain embodiments.

Table I summarizes previously reported thermal conductivity values for TIMs with various fillers. The data shows that the measured TCE in the example graphene-MLG-epoxy composites of certain embodiments disclosed herein is indeed extremely high. Accordingly, certain embodiments of graphene-MLG nanocomposite as disclosed herein are promising as the next generation TIMs. Often, the large TCE factors can be accompanied by increasing electrical conductivity $\sigma$, e.g., decreasing $\rho$ (see references in Table I). In the example case, a record-high TCE without a substantial change in $\rho$ in the examined f range was observed. The increase of TCE without decreasing $\rho$ was reported in a few other studies. For example, a substantial enhancement of K in the composites with CNTs at 1 wt. % loading was reported. See, e.g., M. B. Jakubinek et al., *Appl. Phys. Lett.*, 96, 083105 (2010). The electrical conductivity $\sigma$ of the composites remained low $10^{-11}$-$10^{-9}$ Scm$^{-1}$ in these samples. The low $\sigma$ of $10^{-15}$-$10^{-9}$ Scm$^{-1}$ in the SWNT/PS composites with enhanced K was also reported. See, e.g., M. N. Tchoul et al., *Chem. Mater.*, 20, 3120 (2008).

Without being bound by theory, the increase in K without substantial change in $\sigma$, observed in the example experiments described herein, can be explained by the following. The strong increase in the electrical conductivity in the composite with the electrically insulating matrix can require formation of the percolation network. In the example case described herein, there may be enhancement of K owing to the present of graphene-MLG fillers, perhaps with partial ordering, while the complete percolation network is not formed. The heat can be conducted through the matrix while the electrical current cannot. The narrow layers of the epoxy matrix may not present a substantial thermal resistance while blocking the electric current. An increase in the thickness of the polymer layer from zero to 10 nm may not affect significantly the heat transport while such an increase in the width of the tunneling barrier for the electrons may effectively eliminate the electrical transport. See, e.g., N. Shenogina et al., *Appl. Phys. Lett.*, 87, 133106 (2005) and S. Shenogin et al., *J. Appl. Phys.*, 95, 8136 (2004).

Thus, graphene-MLG nanocomposite polymer TIMs have been synthesized and extremely high TCE factors at low filler loadings have been demonstrated. The TIM testing has been conducted in the industry-type settings so that all other TIM characteristics are in acceptable range for TIMs' practical applications. The TCE of 2300% at f=10% loading is higher than anything reported to-date. Without being bound by theory, the unusual enhancement can be explained for certain embodiments by (i) high intrinsic $K_i$ of graphene and MLG, (ii) low Kapitza resistance at the graphene/matrix interface; (iii) geometrical shape of graphene/MLG flakes ($a \rightarrow 0$); (iv) high flexibility if MLG (n<5); and (v) optimum mix of graphene and MGL with different thickness and lateral size. Additional benefits of the graphene-based composites, which may come at additional expense, are their low coefficient of thermal expansion (see, e.g., A. A. Balandin, Nature Mat., 10, 569-581 (2011)) and increased mechanical strength (see, e.g., S. Stankovich et al., Nature 442, 282-286 (2006) and D. Li et al., Nature Nanotech. 3, 101-105 (2008)). As disclosed herein, it is possible to achieve K~14 W/mK in the commercial thermal grease via addition of only f=2% of certain embodiments of the graphene-MLG nanocomposite mixture. In various embodiments, the graphene-based TIMs have thermal resistance $R_{TIM}$ reduced by orders-of-magnitude and be can produced inexpensively on an industrial scale, thus, allowing for the first graphene application, which consumes this material in large quantities.

Example Theoretical Explanations

To explain the experimental data, the Maxwell-Garnett effective medium approximation (EMA), which works well for f<40% (see, e.g., C. W. Nan et al., J. Appl. Phys. 81, 6692 (1997) and S. H. Xie et al., Appl. Phys. Lett. 92, 243121 (2008)), was used. It was modified to include the size of the fillers, aspect ratios $\alpha$ and TBR between the fillers and matrix. Both graphene and CNTs can be regarded as spheroids with principle dimensions $a_1 = a_2$ and $a_3$. An ideal graphene flake can be treated as an oblate spheroid with $\alpha = a_3/a_1 \rightarrow 0$, while CNT can be treated as a prolate spheroid with $\alpha \rightarrow \infty$. This difference in $\alpha$ was may make graphene a much better filler than CNTs (see, e.g., S. H. Xie et al., Appl. Phys. Lett. 92, 243121 (2008)) in certain embodiments. Assuming randomly oriented fillers and incorporating TBR, for MLG composites:

$$K = K_p[3K_m + 2f(K_p - K_m)] / [3-f)K_p + K_m f + R_B K_m K_p f / H]. \quad (1)$$

Here $R_B$ is TBR at the graphene/matrix interface, while $K_p$ and $K_m$ are thermal conductivity of the filler and matrix materials, respectively. Graphene has a large phonon mean-free path $\Lambda$~775 nm at RT (see, e.g., A. A. Balandin, Nature

TABLE I

Thermal Conductivity Enhancement in TIM Composites

| Filler | TCE | Fraction | Base Material | Method | Reference |
|---|---|---|---|---|---|
| MWNT | 150% | 1.0 vol. % | oil | transient hot wire | S. U. S. Choi et al., Appl. Phys. Lett., 79, 2252 (2001) |
| SWNT | 125% | 1.0 wt. % | epoxy | comparative method | M. J. Biercuk et al., Appl. Phys. Lett., 80, 2767 (2002) |
| p-SWNT | 350% | 9.0 wt. % | epoxy | laser flash | A. Yu et al., Appl. Phys. Lett., 89, 133102 (2006) |
| CNT | 65% | 3.8 wt. % | silicone | ASTM | C. H. Liu et al., Appl. Phys. Lett., 84, 4248 (2004) |
| GNP | 3000% | 25.0 vol. % | epoxy | laser flash | A. Yu et al., J. Phys. Chem. Lett., 111, 7565 (2007) |
| GON | 30%-80% | 5.0 vol. % | glycol and paraffin | comparative method | W. Yu et al., J. Appl. Phys., 107, 094317 (2010) |
| SWNT | 55% | 7.0 wt. % | PMMA | guarded plate | P. Bonnet et al., Appl. Phys. Lett. 91, 201910 (2007) |
| GNP | 10% | 1.0 vol. % | epoxy | transient hot wire | M. T. Hung et al., Appl. Phys. Lett. 89, 023117(2006) |
| Ni | 566% | <30% | epoxy | laser flash | S. Nikkeshi et al., J. Appl. Pol. Science, 69, 2593 (1998) |
| ALN | 1900% | 60% | epoxy | ASTM | M. Ohashi et al., J. Amer. Ceramic Soc., 88, 2615 (2005) |
| BN | 650% | 30 wt. % | epoxy | ASTM | M. J. Hodgin and R. H. Estes, Proceeds. of the National Electronic Packaging and Production Conference, 359 (1999) |
| SWNT | 50% | 1 wt. % | polystyrene | steady state method | M. B. Jakubinek et al., Appl. Phys. Lett., 96, 083105 (2010) |
| Graphite | 1800% | 20 wt. % | epoxy | laser flash | B. Debelak and K. Lafdi, Carbon 45, 1727 (2007) |
| Graphene-MLG | 2300% | 10 vol. % | epoxy | laser flash | As disclosed herein |

Figure 5B:
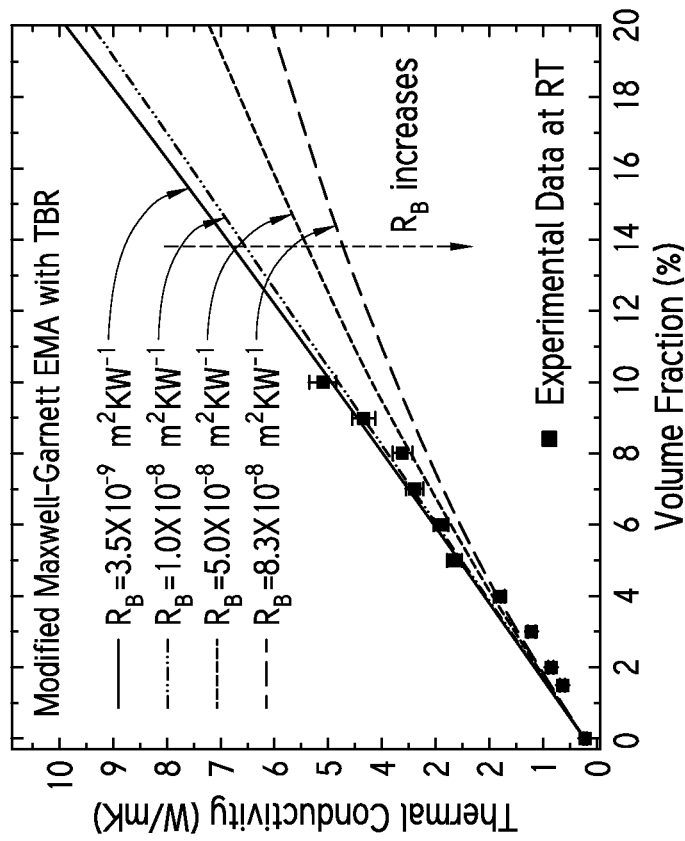
FIG. 5 illustrates the calculated thermal conductivity of graphene-MLG-polymer TIMs in accordance with certain embodiments described herein: (a) Comparison of thermal conductivity of MGL (n=5) and CNTs based TIMs. Note the dependence of thermal conductivity of CNT composites on the aspect ratio and diameter. (b) Thermal conductivity of MLG-polymer TIMs as a function of loading calculated for different values of thermal boundary resistance (TBR) at the MLG/matrix interface. Fitting of the theoretical curves to the experimental data was used for extraction of the actual values of TBR.
Figure 5A:
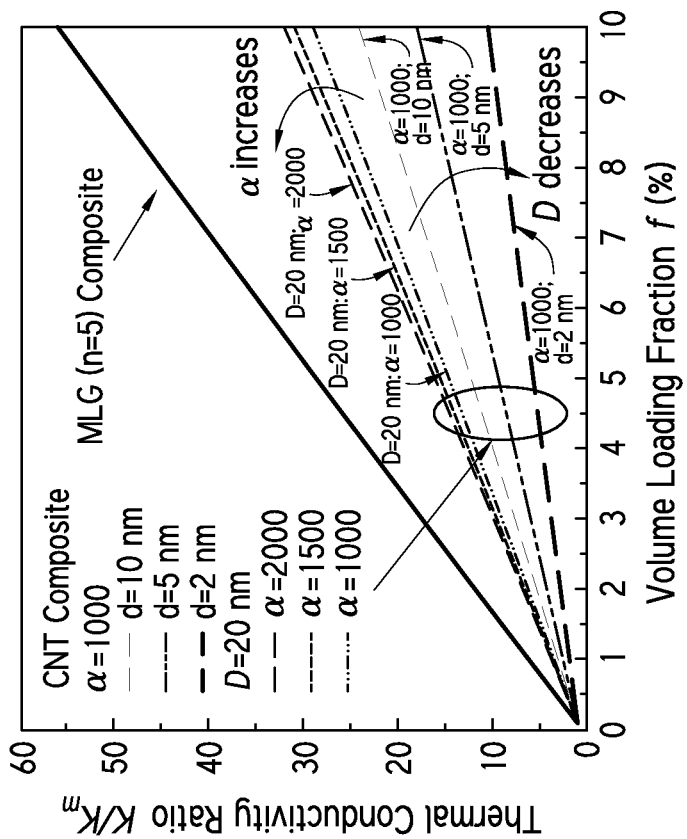

Mat., 10, 569-581 (2011)), which is comparable to L. To account for the size effects on heat conduction inside MLG, the EMA was altered by introducing $K_p = (1/3)Cv\Lambda_{eff}$, where $1/\Lambda_{eff} = 1/\Lambda + 1/L$, C is the specific heat and v is the phonon velocity. For simplicity, $K_p/K_m \sim 1000$ was assumed for both MLG and CNTs, and TBR values for CNTs and graphene were taken as $\sim 8.3 \times 10^{-8}$ m$^2$ KW$^{-1}$ (see, e.g., S. Huxtable et al., *Nat. Mater.* 2, 731-734 (2003)) and $\sim 3.7 \times 10^{-9}$ m$^2$ KW$^{-1}$ (see, e.g., D. Konatham and A. Striolo, *Appl. Phys. Lett*, 95, 163105 (2009)), respectively. FIG. 5 (a) shows calculated ratio $K/K_m$ vs. f for MLG (L=100 nm) and CNT composites. As shown, MLG can produce higher TCE than CNTs even as one varies a and diameter D of CNTs in a wide range. The thermal conductivity model of the graphene fillers is based on the kinetic theory and only considers the lateral size effect without accounting for other effects such as the substrate scattering.

The modified EMA was used to extract actual TBR in various embodiments of nanocomposite graphene-MLG-epoxy TIMs by fitting calculated K to the experimental data and varying $R_B$ value (FIG. 5 (b)). For MLG, $\alpha=0.01$ ($\approx$H/L) was used and $\Lambda=775$ nm (see, e.g., I. Calizo et al., A. A., *J. Appl. Phys.* 106, 043509 (2009)) was assumed. In this example, the best match with experiment is attained at $R_B=3.5\times 10^{-9}$ Km$^2$W$^{-1}$. This value is small and consistent with the molecular dynamics (MD) simulations (see, e.g., D. Konatham and A. Striolo, *Appl. Phys. Lett*, 95, 163105 (2009)). Calculations indicate that for higher $R_B$, TCE for certain embodiments does not increase with f linearly but starts to saturate. In addition to the geometrical factors, the reduction of TBR at the filler/matrix interface can be another important condition for achieving high TCE for graphene-MGL nanocomposite.

Consistent with an ab initio density function theory (DFT) and MD study (see, e.g., D. Konatham and A. Striolo, *Appl. Phys. Lett*, 95, 163105 (2009) and D. Konatham et al., *Molecular Physics* 109, 1, 97-111 (2011)), extraordinary K enhancement in ordered graphene composites ($K/K_m \approx 360$ at $f \approx 5\%$) might be due to graphene's planar geometry and strong coupling of the functionalized graphene to the organic molecules with the corresponding decrease in Kapitza resistance. This may imply that certain phonon modes excited in graphene and couple well to those in organic molecules and the mismatch in the phonon DOS between graphene-matrix is smaller than between CNT/matrix.

It follows from analysis that graphene's geometry ($\alpha \rightarrow 0$ in graphene as opposed to $\alpha \rightarrow \infty$ in CNTs) and lower Kapitza resistance can be some key factors in achieving outstanding TCE in certain embodiments. The role of the percolation threshold is not clear yet. Theory suggests that $f_T \sim 1/\alpha$ (see, e.g., N. Shenogina et al., *Appl. Phys. Lett.*, 87, 133106 (2005)), which can explain the low electrical percolation $f_T$ for CNTs. This can also indicate that for certain embodiments of MLG, $f_T$ should be much larger and heat conduction is assisted, instead, by better graphene and MLG thermal coupling to the matrix. The latter conclusion can be supported by the extracted value of $R_B$ and theoretical estimates of Kapitza resistance. These considerations do not exclude attachments of graphene and MLG flakes to each other with good thermal links without forming a completely percolated network. In the examined f range the TIM samples remained electrically insulating with the measured electrical resistivity of $\rho \approx 1.4 \times 10^9$ $\Omega$-cm.

In certain embodiments, it can be important to have both graphene and MGL in the nanocomposite, e.g., to have the graphene-MLG mixture, for achieving maximum TCE. The single-layer or bilayer graphene can have greater flexibility to form the thermal links while $K_p$ in MGL (n>3) can be subject to less degradation due to phonon-boundary scattering (see, e.g., A. A. Balandin, *Nature Mat.*, 10, 569-581 (2011)). The TIM performance, defined by $R_{TIM}$, can depend not only on K but also on BLT. See, e.g., R. Prasher, *Proceedings of IEEE*, 94, 1571-1585 (2006); F. Sarvar et al., *Proceeds. Electronics System Integration Technology Conference* (IEEE 1-4244-0553), 2, 1292-1302 (2006); and R. S. Prasher et al., *Intel Technology Journal*, 9, 285-296 (2005). The samples were estimated to have BLT$\leq$5 µm at relevant P. BLT evolution with f follows the equations BLT$\sim \tau_y/P$, with the yield stress given as $\tau_y = A[1/((f/f_m)^{1/3}-1)^2]$, where A is a constant and $f_m$ is the maximum filler particle volume fraction. See, e.g., S. V. Garimella et al., *IEEE Transactions on Components and Packaging Technologies*, 31, 801-815 (2008). Using an approximate BLT and measured TCE of 2300%, $R_{TIM}$ of the nanocomposite graphene-MLG TIMs was conservatively estimated to be, at least, on the order of magnitude smaller than that of conventional or CNT based TIMs. The achieved TCE at f=10% is higher than that in graphite composites (see, e.g., B. Debelak and K. Lafdi, *Carbon* 45, 1727 (2007)), GnP-CNT epoxy composites (see, e.g., A. Yu et al., *Adv. Mater.* 20, 4740 (2008) and C. Lin and D. D. L. Chung, *Carbon*, 47, 295 (2009)), graphite nanocomposites (see, e.g., H. Fukushima et al., *J Thermal Analysis and calorimetry*, 85, 235 (2006)), or chemically functionalized graphite composites (see, e.g., S. Gangui et al., *Carbon*, 46, 806 (2008)) at the same or even higher carbon loading.

Synthesis of the Graphene-MLG Nanocomposite Thermal Interface Materials

Figure 6:
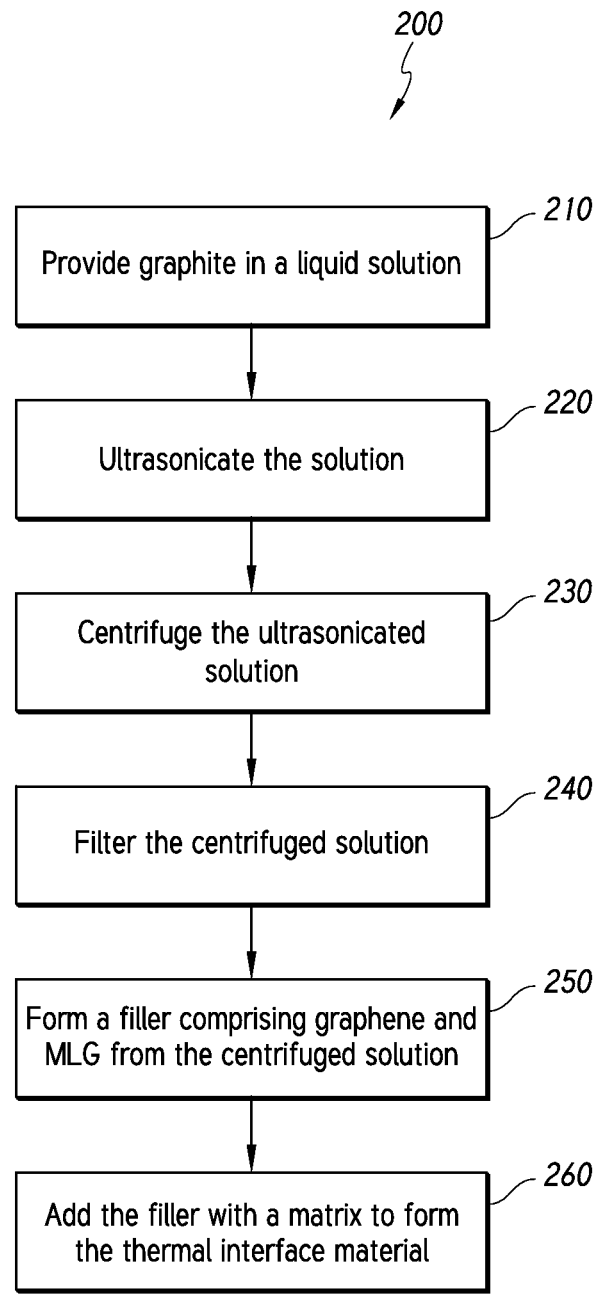
FIG. 6 is a flowchart of an example method 200 of manufacturing a thermal interface material 100 in accordance with certain embodiments described herein.

FIG. 6 is a flowchart of an example method 200 of manufacturing a thermal interface material 100 in accordance with certain embodiments described herein. In some embodiments, the method 200 manufactures a thermal interface material 100 as described herein. For example, the thermal interface material 100 can include a matrix 110 and a filler 120. The filler 120 can include graphene and MLG disposed within the matrix 110.

The method 200 can include providing graphite in a liquid solution as shown in operational block 210. Providing graphite in a liquid solution can include providing graphite powders in an aqueous solution of sodium cholate. The method 200 also can include ultrasonicating the solution and centrifuging the ultrasonicated solution, as shown in operational blocks 220 and 230 respectively. Ultrasonicating the solution can occur for about 10 hours to about 15 hours (e.g., for about 11 hours, for about 12 hours, or for about 13 hours). Centrifuging can occur at a centrifugation rate between about 5K-rpm and about 20K-rpm (e.g., for about 10K-rpm or for about 15K-rpm).

The method 200 further can include filtering the centrifuged solution and forming a filler 120 including the graphene and MLG from the centrifuged solution, as shown in operational blocks 240 and 250 respectively. In some embodiments, filtering the centrifuged solution includes decanting the upper layers of the centrifuged solution, and forming the filler 120 includes forming the filler 120 from the decanted layers. In various embodiments, forming the filler 120 can also include drying the filtered solution to form a suspension, dispersing the suspension in a liquid, ultrasonicating the liquid, and drying the liquid. Drying the filtered solution or drying the liquid can include drying in a vacuum oven. Dispersing the suspension in a liquid can include dispensing the suspension in water. Other liquids are possible.

As shown in operational block 260, the method 200 can further include adding the filler 120 with a matrix 110 to form the thermal interface material 100. In some embodiments, adding the filler 120 with a matrix 110 can include mixing the filler 120 with a matrix material that forms into the matrix 110 and heating the mixed matrix material.

Example Embodiments

The graphene-MLG nanocomposites were prepared by ultrasonication (~10-12 hrs) of natural graphite in aqueous solution of sodium cholate. The solution was left for ~1 hr to settle followed by removal of thick graphite flakes. The ultrasonicated solution underwent sedimentation processing in a centrifuge. The centrifugation was performed at 15 K-rpm for 5 min. After centrifugation the top layer was decanted and dried in a vacuum oven. It was again dispersed in water by the high-sheer mixing followed by ultrasonication for ~2 hrs. The solvent was dried at 60° C. in a vacuum oven leaving graphene and MLG having about 1-10 stacked atomic monolayers. The epoxy resin (diglycidyl ether of bisphenol F, EPON 862, Hexion) was added to the suspension following an in-house developed procedure. The curing agent (diethyltoluenediamine, EPI-CURE) was added under continuous stirring in a ratio of epoxy to curing agent of 100:26 by weight. The homogeneous mixture of epoxy and graphene-MLG nanocomposite was loaded into a custom stainless steel mold, heated and degassed in vacuum for curing. The composites were cured at 100° C. for 2 h and at 150° C. for additional 2 h to complete the curing cycle. A large number of samples was prepared with different graphene loadings varying between about 1-10% of volume fraction.

Figure 7:
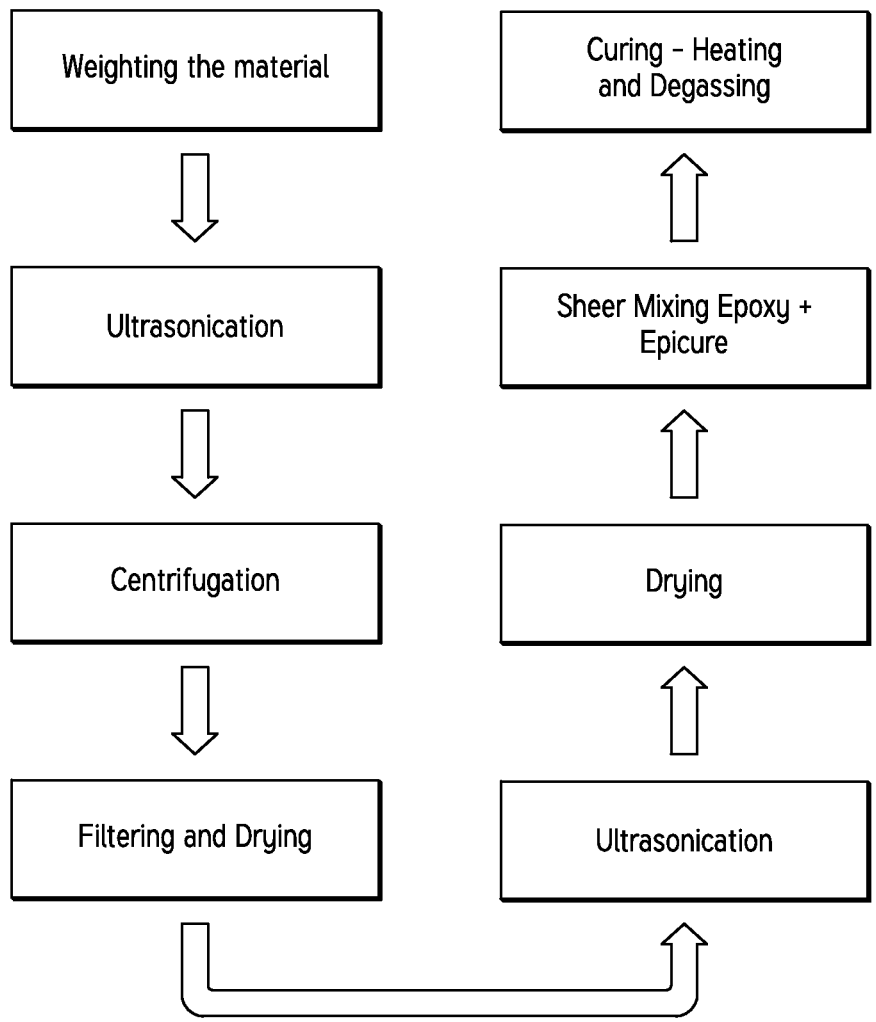
FIG. 7 is a schematic of an example hybrid graphene-MLG epoxy composite TIM process.
Figure 8:
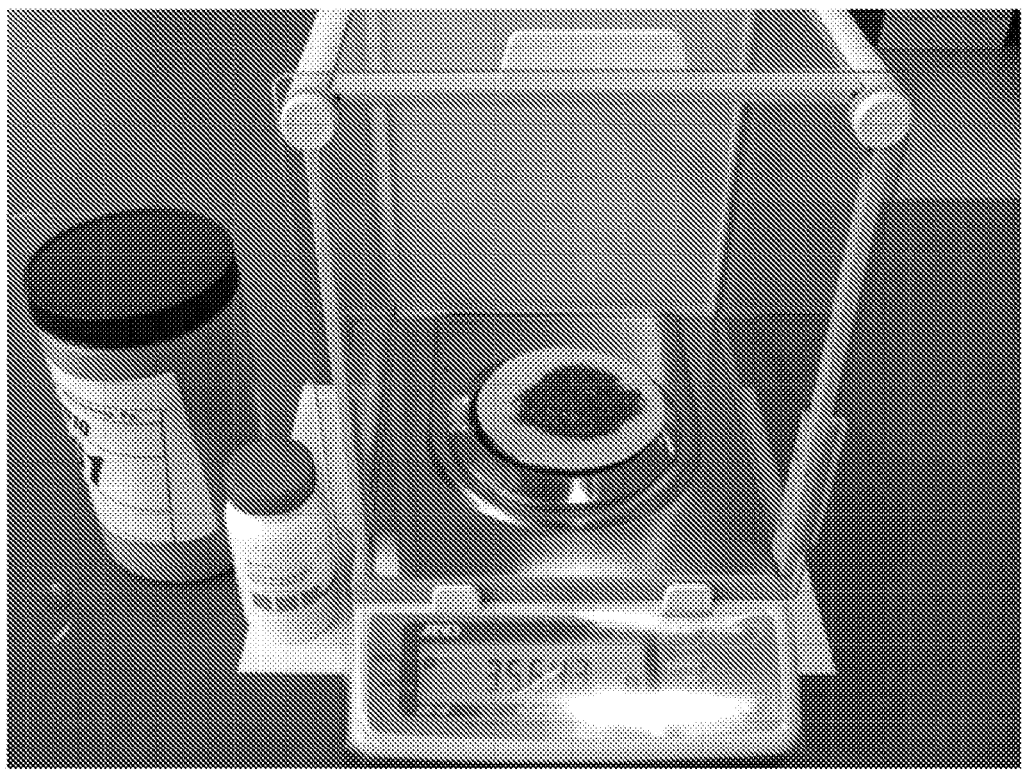
FIG. 8 shows an example method of determining the weight of the utilized materials—natural graphite and sodium cholate.
Figure 9:
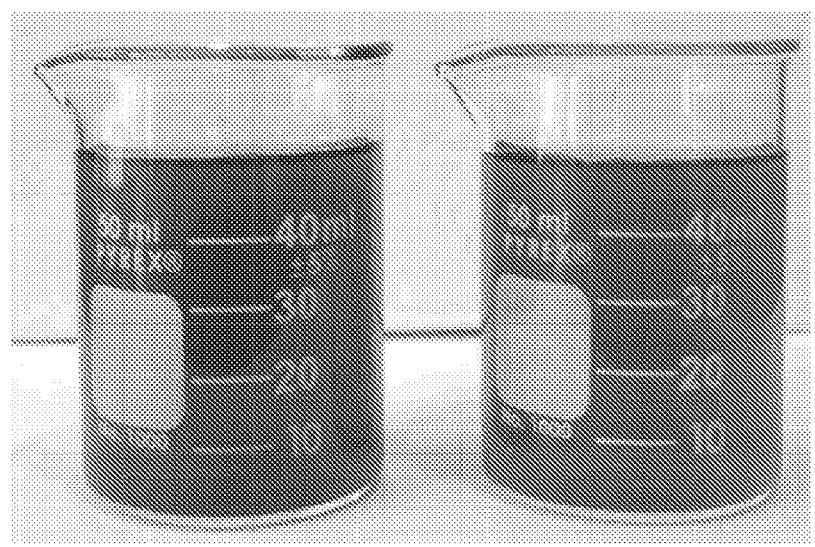
FIG. 9 shows an example solution after the first ultrasonication in accordance with certain embodiments described herein.

The sample preparations involve the steps shown in FIG. 7. FIG. 7 is a schematic of an example hybrid graphene-MLG epoxy composite TIM process. First, 10 gm of natural graphite flakes were added to 100 mL of 2% w/v sodium cholate (SC) aqueous solution. FIG. 8 shows an example method of determining the weight of natural graphite and sodium cholate. In order to maximize the graphene-MLG dispersion, a high initial graphite concentration was used. The dispersion was prepared under the ice-cooling with the high-power ultrasonication. The ultrasonication was performed for ~12 hr in order to prepare acceptable dispersion of graphitic material. FIG. 9 shows an example solution after the first ultrasonication in accordance with certain embodiments described herein. In general, the longer sonication times result in smaller flakes which can be dispersed at higher concentrations. Continuous refilling of the bath water was used to maintain the sonication efficiency and prevent overheating. The process gives not only graphene and thin MLG sheets but also some fraction of thick graphene-graphite slurry. The solution was left to settle for ~1 hr to allow thick graphite flakes to sediment out of the solution. The top portion of the solution has relatively homogeneous mixture, which is carefully decanted.

Figure 10:
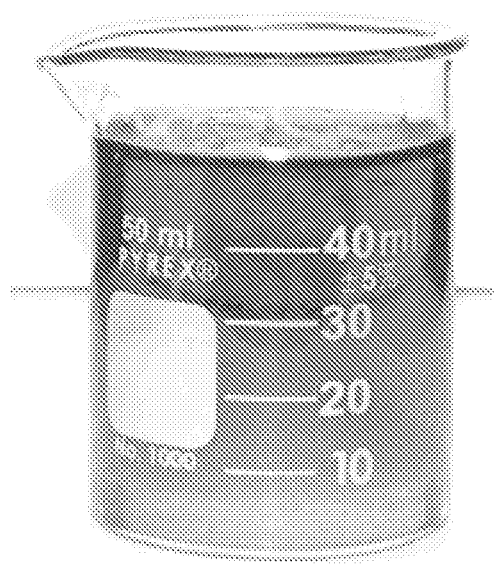
FIG. 10 shows an example epoxy resin mixed with curing agent under continuous stirring in accordance with certain embodiments described herein.
Figure 11:
FIG. 11 shows an example oven used for curing.
Figure 12:
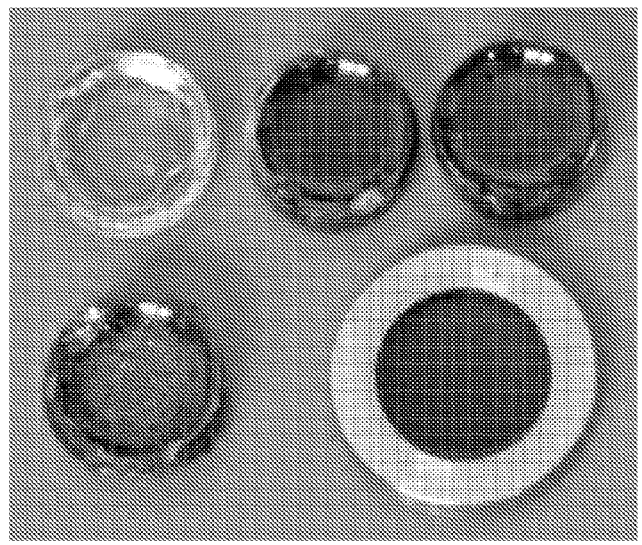
FIG. 12 shows prepared graphene-MLG-hybrid epoxy TIMs in accordance with certain embodiments described herein.

The next step is to remove relatively thick layer of graphite material from the dispersion. The solution was centrifuged in filled 2 mL eppendrof tubes at 15 K-rpm for 5 minutes. After centrifugation the top 1 mL was carefully separated from each tube and combined. The dispersions (see FIG. 9) were stable for several weeks and retained for future use. The centrifuged graphene solutions were dried in a vacuum oven at 100° C. leaving a suspension of predominately MLG. The MLG was dispersed in water followed by ~2 hr ultrasonication. This step was carried out to stabilize the thinnest MLG flakes (n is less than 10 layers), which can be essential for the enhancement of thermal properties in certain embodiments. Finally, the solvent was dried in a vacuum oven leaving the hybrid consisting of graphene and MLG with n=2-10. The epoxy resin (diglycidyl ether of bisphenol F, EPON 862, source: Hexion) was added to the graphene-MLG suspension. The homogeneous mixture was prepared by the high-sheer mixing. The curing agent (diethyltoluenediamine, EPI-CURE W) was added under continuous stirring in a ratio of epoxy to curing agent of 100:26 by weight. FIG. 10 shows an example epoxy resin mixed with curing agent under continuous stirring in accordance with certain embodiments described herein. The homogeneous mixture of the epoxy and graphene-MLG was loaded into a custom stainless steel mold, heated and degassed in vacuum for curing. FIG. 11 shows an example oven used for curing. The composites were cured at 100° C. for 2 h and at 150° C. for additional 2 h to complete the curing cycle. The curing temperature was determined and performed in a vacuum oven. The samples were then left for the cool-down and polished. Several samples were prepared with different graphene-MLG loadings varying between about 1-10% of the volume fraction. FIG. 12 shows the prepared graphene-MLG-hybrid epoxy TIMs in accordance with certain embodiments described herein.

Figure 13:
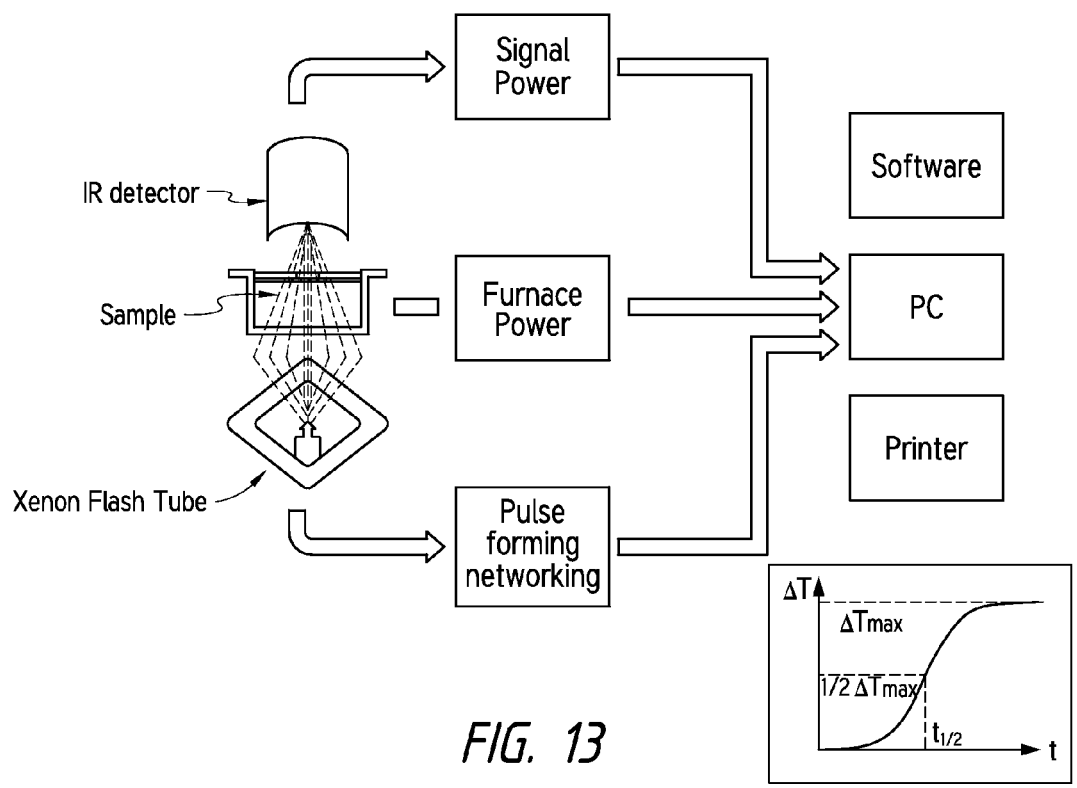
FIG. 13 is a schematic diagram illustrating an example LASER Flash technique.
Figure 14B:
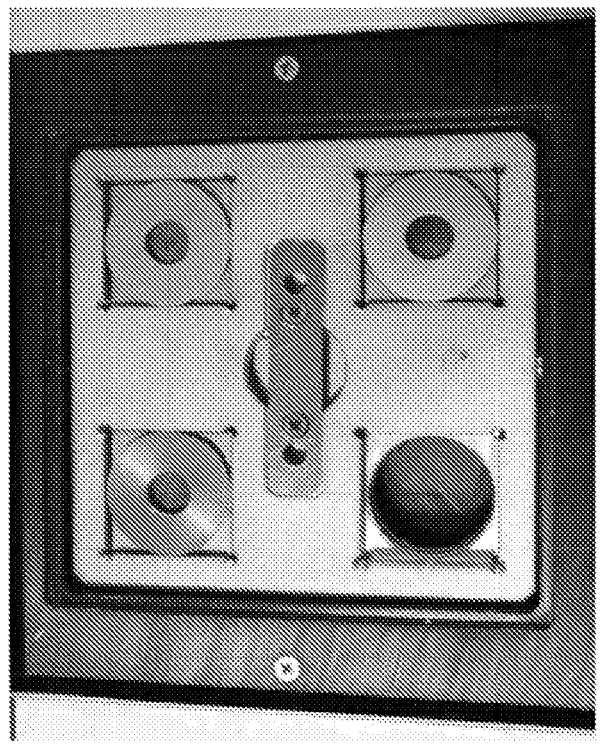
FIG. 14 shows (a) an example laser flash equipment used for the measurements; and (b) an example sample holder.
Figure 14A:
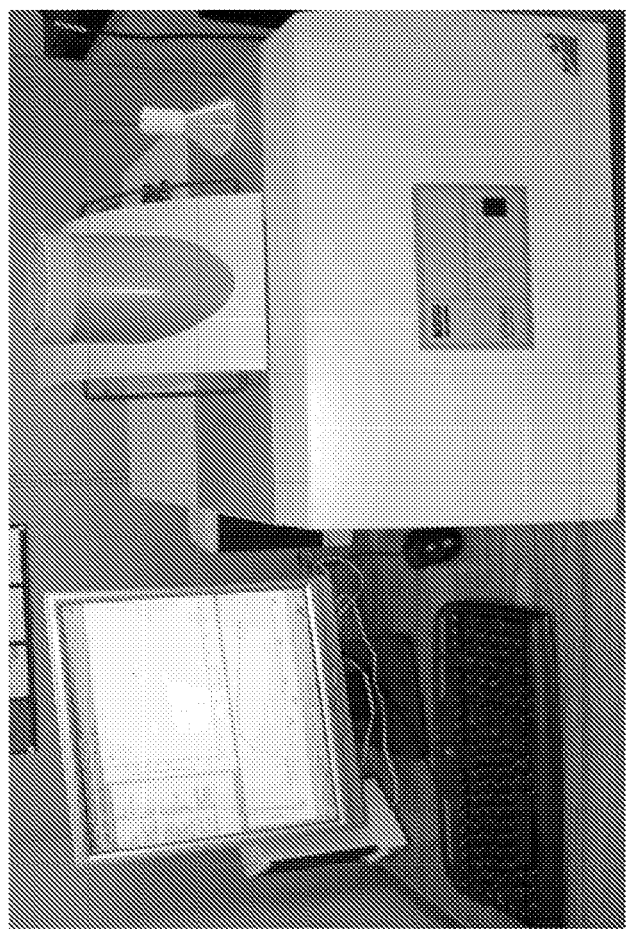

The measurements of thermal conductivity, K, were performed by the transient "laser flash" technique (LFT, NETZSCH LFA). FIG. 13 is a schematic diagram illustrating an example LASER Flash technique (LFT). FIG. 14 shows (a) an example laser flash equipment used for the measurements; and (b) an example sample holder. The LFT technique uses a xenon flash lamp, which heats the sample from one end by producing shots with energy of 10 J/pulse. The integrated automatic sample changer allowed unattended analysis of up to 4 samples. The temperature rise was determined at the back end with the nitrogen-cooled InSb IR detector. The output of the temperature detector was amplified and adjusted for the initial ambient conditions. The recorded temperature rise curve is the change in the sample temperature resulting from the firing of the flash lamp. The magnitude of the temperature rise and the amount of the light energy are not used for a diffusivity determination; only the shape of the curve is used in the analysis. From the analysis of the resulting temperature versus-time curve the thermal diffusivity can be determined. For the specific heat measurement, the magnitude of the temperature rise of an unknown sample was compared to that of the reference calibration sample. Thermal conductivity was determined from the equation $K=\rho\alpha C_p$, where $\alpha$ is the thermal diffusivity of the film determined in the experiment, $C_p$ is the heat capacity, and $\rho$ is the mass density of the material. As disclosed herein, the example embodiments of TIMs allow significant improvement of heat conduction properties.

Part B: Metallic Tim-Graphene Composite Materials and Methods of Making the Same With the ever reducing device size and increasing design complexity, high power density and escalating hot spot temperatures can become difficult to manage. See, e.g., S. P. Gurrum et al., *IEEE Trans. Dev. Mater. Reliab.* 2004, 4, 709 and A. A. Balandin, "New Materials and Designs can Keep Chips Cool," invited feature, *IEEE Spectrum*, October 2009, p. 29. Thermal management can become a critical issue because of the rapid increase in power dissipation from silicon chips. This situation has posed a need for improved thermal interface materials (TIMs) which facilitate heat transfer across interface by reducing the contact resistance between the heat-generating chip and heat-sinking units. See, e.g., J. Wei, "Challenges in Cooling Design of CPU Packages for High-Performance Servers", *Heat Transfer Engineering*, 2010, 29(2), 178. The selection of a suitable TIM material to fill the interface between a chip and a heat spreader can be important to the performance and reliability of the semiconductor device. See, e.g., R. Mahajan et al., *Electronics Cooling*, 2004, 1, 10.

High thermal conductivity of TIMs is generally needed for high performance. See, e.g., F. Sarvar et al., Electronics Systemintegration Technology Conference, Dresden, Germany, 2006, 1292 and J. P. Gwinn and R. L. Webb, *Microelectronics Journal*, 2003, 34, 215. It has been suggested analytically that an increase in TIM thermal conductivity to 7 W/mK can translate into an improvement of package thermal performance by 0.1° C./W. See, e.g., G. Xu et al., *J Therm*, 2004, 1, 186. There has been a transition from polymer based TIMs to the ones with metallic particles and spheres as fillers to cope up with the demand of increased thermal conductivity. See, e.g., D. L. Saums, "Developments with metallic thermal interface materials," *Electronics Cooling*, May 2007, p. 1-6. The thermal conductivity enhancement by loading of the metal particles can be limited by their thermal contact with each other and with the surfaces across which the TIM is applied. See, e.g., M. J. Rightley et al., "Advancement in Thermal Interface Materials for Future High-Performance Electronic Applications: Part 1," *Sandia Report, SAND*2007-0417, February 2007. For this reason, much attention is focused on search of new materials with high thermal conductivity to serve as fillers.

Carbon nanotubes (CNT) and graphene have been considered as filler materials with an intention of enhancement in thermal conductivity of TIMs owing to their very high thermal conducting properties of CNTs. See, e.g., W. E. Jones Jr. et al. *Materials* 2010, 3, 1478 and A. Yu, et al., *Journal of Physical Chemistry C* 2007, 111, 7565. Graphene, $sp^2$ bonded single carbon sheet, has attracted much attention owing to its novel mechanical, electrical and thermal properties. See, e.g., A. K. Geim and K. S. Novoselov, *Nat. Mater.* 2007, 6, 183; K. S. Novoselov et al., *Science* 2004, 306, 666; and A. A. Balandin et al., *Nano Lett.* 2008, 8, 902. One of its potential applications can include its incorporation into polymer matrices. See, e.g., S. Stankovich et al., *Nature* 2006, 442, 282. There have been advances in the production of exfoliated graphene sheets in bulk quantities.

Certain embodiments enhance thermal conductivity of TIMs with metallic fillers as well as graphene fillers simultaneously. Graphene's high thermal conductivity, planar geometry allowing lower filler-matrix interface resistance can contribute to the enhanced thermal conductivity in graphene-epoxy composites in certain embodiments. In various embodiments, enhancement in thermal conductivity of silver epoxy (e.g., epoxy loaded with silver particles) along with graphene is provided. Certain embodiments can be implemented with different material loading, for example, diamond loaded epoxies, etc. It can be implemented with low-cost as compared to CNTs and offers thermal conductivity enhancement over a wide temperature range (including room temperature and above).

Figure 15:
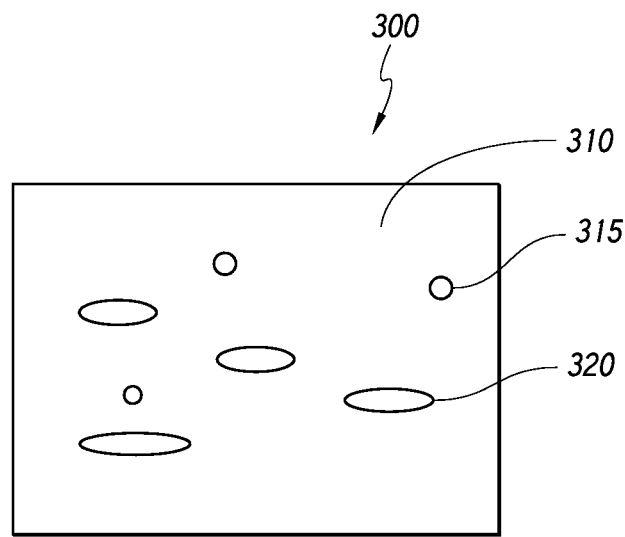
FIG. 15 is an example thermal interface material in accordance with certain embodiments described herein.

FIG. 15 is an example embodiment of a thermal interface material in accordance with certain embodiments described herein. The thermal interface material 300 includes a matrix 310 and a first filler 315. The thermal interface material 300 can also include a graphene filler 320. For example, in various embodiments, the first filler 315 is a metallic filler. In other embodiments, the first filler is any non-metallic filler known in the art (e.g., polymer, diamond, silica, alumina, or $ZnO_2$) or yet to be developed. Certain embodiments allow significant improvement of the heat conduction properties.

In certain embodiments, similar to matrix 110 of FIG. 2, the matrix 310 can include any matrix material used for thermal interface materials. For example, in some embodiments, the matrix 310 can include an epoxy or thermal grease. As shown in FIG. 15, the matrix 310 can include a first filler 315, e.g., a metallic filler. For example, the first filler 315 can include microscopic metal particles (e.g., microscopic silver particles). As described herein, it is contemplated that other fillers known in the art or yet to be developed can also be used. For example, the metallic filler 315 can be replaced with a diamond filler. Furthermore, the matrix 310 can also include a graphene filler 320. As described herein, graphene is a single atomic plane of $sp^2$-bound carbon. It has an extremely high intrinsic thermal conductivity $K_i$. It is also contemplated that graphene based fillers (e.g., a combination of graphene and MLG as disclosed herein) can also be used.

The thermal interface material 300 can include less than or equal to about 50 volume % of the graphene filler 320 (e.g., between about 0.5 volume % and about 40 volume %, between about 0.5 volume % and about 30 volume %, between about 0.5 volume % and about 25 volume %, between about 0.5 volume % and about 20 volume %, between about 0.5 volume % and about 15 volume %, between about 0.5 volume % and about 10 volume %, between about 0.5 volume % and about 5 volume % of the graphene filler 320). As described herein, certain embodiments of the thermal interface material 300 can have improved heat conduction properties by adding less than or equal to about 25 volume % of the graphene filler 320 (e.g., between about 0.5 volume % to about 20 volume %, between about 0.5 volume % to about 15 volume %, between about 0.5 volume % to about 10 volume %, between about 0.5 volume % to about 5 volume % graphene, or between about 0.5 volume % to about 2.5 volume % graphene). For example, for a thermal interface material 300 including less than or equal to about 25 volume % graphene filler (e.g. less than or equal to about 5 volume % graphene filler) in an epoxy matrix, the thermal conductivity can be within a range of about 2 W/mK to about 15 W/mK at room temperature. In certain embodiments, the thermal conductivity can also remain within the range of about 2 W/mK to about 15 W/mK for temperatures between about 5° C. and about 75° C.

Figure 16:
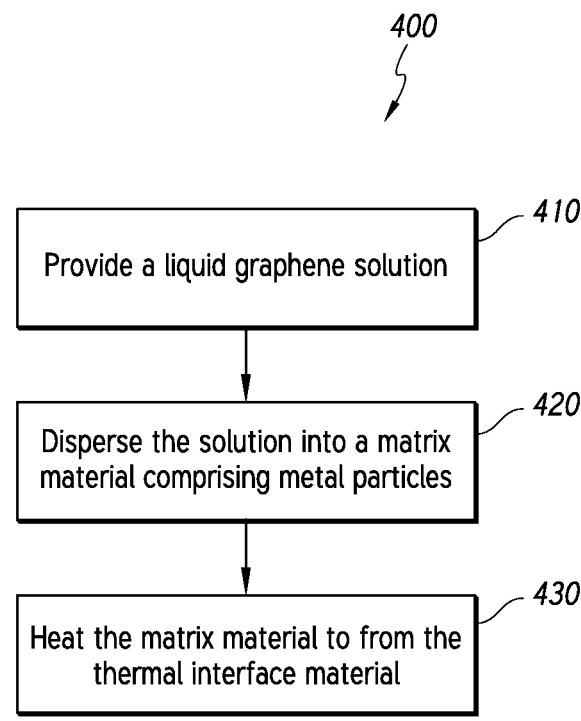
FIG. 16 is a flowchart of an example method of manufacturing a thermal interface material in accordance with certain embodiments described herein.

FIG. 16 is a flowchart of an example method 400 of manufacturing a thermal interface material 300 in accordance with certain embodiments described herein. In some embodiments, the method 400 manufactures a thermal interface material 300 as described herein. For example, the thermal interface material 300 can include a matrix 310, a first filler 315, and a graphene filler 320.

The method 400 can include providing a liquid graphene solution as shown in operational block 410. The method 400 also can include dispersing the solution into a matrix material including first particles (e.g., metal particles), as shown in operational block 420. Dispersing the solution into the matrix material can include dispersing the solution ultrasonically in an epoxy loaded with the particles of the first filler 315 (e.g., metallic particles). For example, the matrix material could include silver loaded epoxy. In some embodiments, the method 400 further can include adding a hardener to the solution and high shear mixing the solution. The method 400 further can include heating the matrix materials to form the thermal interface material 300 as shown in operational block 430. Heating the matrix material can cure the epoxy. Heating can also remove remaining solvent and air bubbles.

Example Embodiments

According to certain embodiments, metallic TIM-graphene composites can be prepared by ultrasonic dispersion of aqueous graphene solution into the epoxy, pre-loaded with metal particles, followed by high shear mixing for good dispersion. The commonly used (and readily available) silver epoxy (chemtronics CW2400 conductive epoxy), which is pre-processed epoxy with silver particles as filler materials was used in certain embodiments. Graphene platelets were prepared by isolation of graphene sheets via density gradient ultracentrifugation (DGU). See, e.g., A. A. Green and M. C. Hersam, *Nano Lett.* 2009, 9, 4031. In DGU, aqueous solution of graphite flakes is centrifuged in a density gradient fashion giving control on graphene sheet thickness. The final product is sodium cholate (SC) encapsulated graphene sheets with graphene concentration of 0.05 mg/mL. This solution was further treated thermally to reduce surfactants present in the graphene films, further improving flake to flake contact. See, e.g., id.

FIG. 17 shows (a) an example optical image of graphene solution; and (b) an example electron diffraction pattern of the graphene sample showing crystalininty of graphene flakes. For composite preparation, the aqueous graphene solution was dispersed ultrasonically for 15 minutes in the silver epoxy paste followed by addition of hardener with high-shear mixing for ~5 minutes (the pot life of silver epoxy is 8-10 min). The mixture was then loaded in a custom-made disk-shaped stainless steel mold with a diameter of 10 mm and a thickness of 5 mm. FIG. 18 shows a schematic of (a) an example stainless steel mold; and (b) example silver epoxy/graphene molded disks used for measurements. The dimensions of the mold were chosen to have suitable sample sizes which can be accommodated in the experimental technique used to measure their thermal conductivity. The mold was cleaned using acetone and isopropyl alcohol (IPA) to remove any surface contamination before transferring mixture into it. The residual solvent was removed by baking the mold (containing composite mixture) at 120° C. for ~10 minutes, which is typical curing temperature of this conductive epoxy. The composite samples were further baked at 80° C. for 4 hours to remove remaining solvent and air bubbles from the silver epoxy/graphene composites (if any). As shown in FIG. 18 (a), the middle steel plate have the circular cavity in which the epoxy-graphene mixture was loaded, the upper and lower plates were used to pressure the mixture lowering the possibility of any air bubble formation. Several epoxy/graphene specimens were prepared with graphene loading varying from 0.5 to 3 weight %. For comparison, silver epoxy composites filled with carbon black were also prepared using the same above-mentioned procedure.

Thermal conductivity of these disk-shaped specimens: base silver epoxy (pristine) and silver epoxy/graphene composites with different mass fraction of graphene was measured using transient plane source hot-disk technique (Hot Disk TPS2500 S, Hot Disk AB Company, Sweden). See, e.g., V. Goyal et al., *Appl. Phys. Lett.* 2010, 97, 031904. The hot disk technique has been used as a thermal conductivity measurement tool for expanded graphite (EG)/paraffin composite phase change materials (PCMs) (see, e.g., M. A. Rafiee et al., *ACS Nano* 2009, 3, 3884) as well as for thermal greases by industry (Intel) (see, e.g., Y. He, *Thermochimica Acta* 2005, 436, 130). The thermal conductivity was measured by sandwiching an electrically insulated flat disk-shaped nickel sensor with radius 2.001 mm in between two identical samples of same composition epoxy/graphene composite. The sensor behaves as the heat source and the temperature monitor simultaneously. The surfaces of the specimen were flattened and cleaned to reduce contact resistance between the sensor-sample surfaces. Interfacial thermal resistance between nickel-kapton (insulating layer) was taken care by the software itself (see, e.g., Y. He, *Thermochimica Acta* 2005, 436, 130 and S. E. Gustafsson, *Rev Sci Instrum* 1991, 62, 79); and between sample-sensor surface was separated by using data points generated after short time t for thermal diffusivity calculations (see, e.g., V. Goyal et al., *Appl. Phys. Lett.* 2010, 97, 031904); t is the time after which the average temperature rise in the sample due to applied electric pulse becomes constant.

Figure 19:
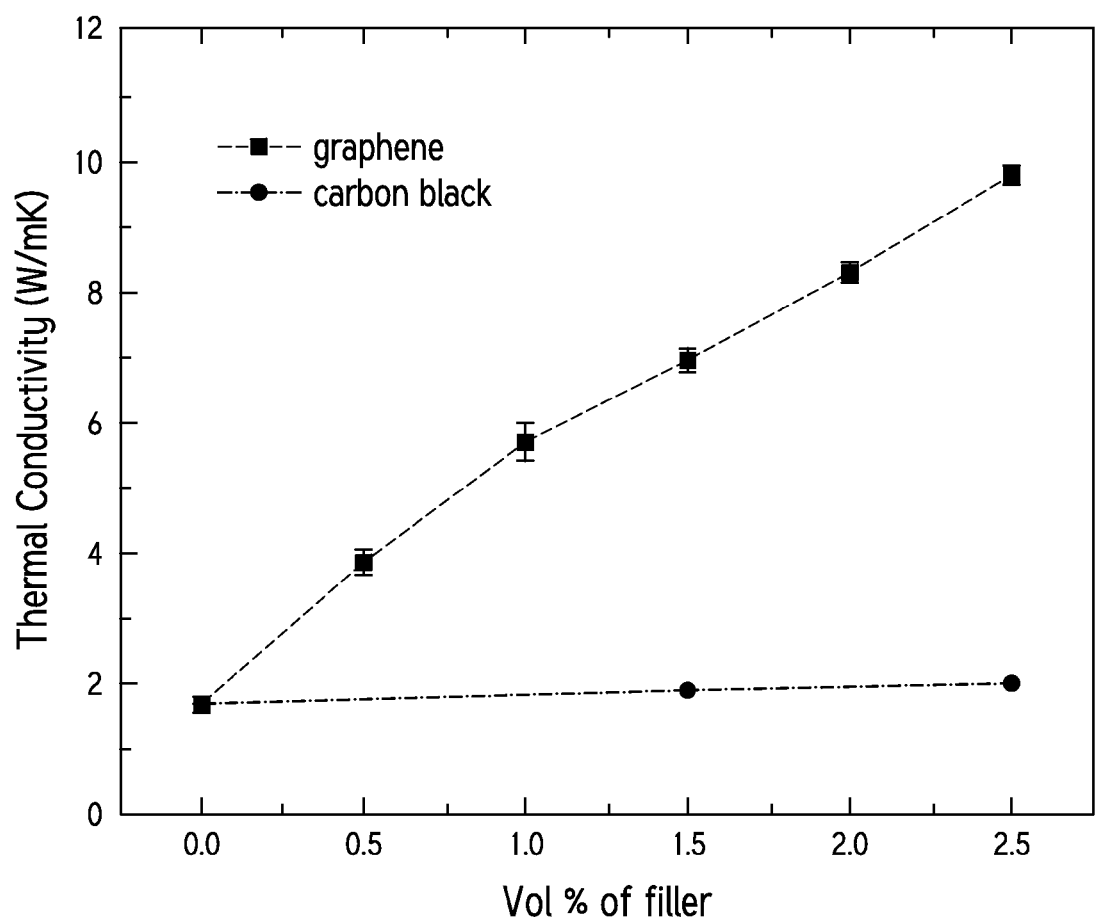
FIG. 19 illustrates the thermal conductivity of pristine silver epoxy, certain embodiments of silver epoxy/graphene composites, and silver epoxy/carbon black composites as a function of vol % of graphene filler. Dotted lines are to guide eyes.

Ten specimens of each composite weight fraction were prepared and measured to verify the repeatability of the data. FIG. 19 shows the measured thermal conductivity of pristine silver epoxy, certain embodiments of graphene/epoxy composites, and carbon black/epoxy composites. Dotted lines are to guide eyes. The error bars represent the data scattering based on measurements of different samples. The thermal conductivity of the composites increases greatly with increase in the mass/volume fraction of graphene. The thermal conductivity of pristine silver epoxy was measured to be ~1.67 W/mK (value provided by the supplier ~1.6 W/mK). Thermal conductivity value of the epoxy/graphene composite with 2.5 vol % of graphene reached to ~9.9 W/mK, more than 6-folds higher than that of pristine silver epoxy, which is equivalent to 500% increase in thermal conductivity.

Only solid parts were used for the calculations of weight fraction which includes graphene, epoxy (resin+hardener) and surfactant (sodium cholate, used to wrap the graphene flakes) iodixanol (molecule used in the purification process). See, e.g., A. A. Green and M. C. Hersam, *Nano Lett.* 2009, 9, 4031. The weight fraction was then converted to volume fraction using volume fraction equation for fibrous composites given by $V_{GF}=W_{GF}/[(W_{GF}+(\rho_{GF}/\rho_{epoxy})(1-W_{GF}))]$ where, $V_{GF}$ and $W_{GF}$ are the volume and weight fraction of graphene flakes, $\rho_{GF}$ and $\rho_{epoxy}$ are the density of graphene and silver epoxy respectively. See, e.g., M. A. Rafiee et al., *ACS Nano* 2009, 3, 3884. Density of silver epoxy (resin+hardener) was determined to be ~1.67 g/cc. Density of graphene can be estimated to be ~2.2g/cc. The volume of the graphene unit cell is equal to $V_0=3\sqrt{3}a^2h$, where a=0.142 nm and thickness of graphene layer h=0.35 nm. The unit cell consist of 2 carbon atoms, so mass of the unit cell $m=2M_{carbon}$. Therefore, graphene density is given by $\rho=m/V_0=2M_{carbon}/V_0 \approx 2.2$ g/cc. Using above values, the weight fraction of 0.56% translates into ~0.5 vol %, etc.

Figure 20:
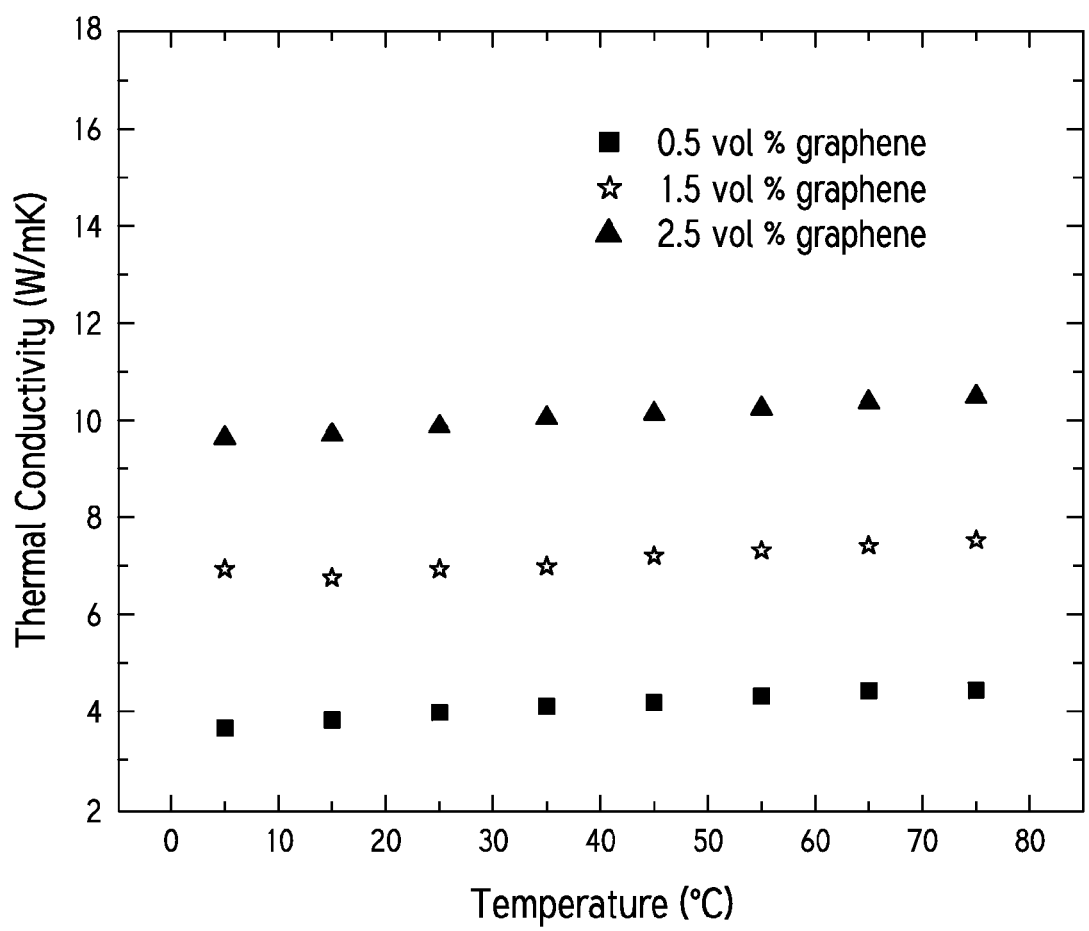
FIG. 20 illustrates the thermal conductivity as a function of temperature for epoxy/graphene composites with different vol % of graphene in accordance with certain embodiments described herein.

Temperature dependent thermal conductivity was also studied on these samples. FIG. 20 illustrates the thermal conductivity as a function of temperature for epoxy/graphene composites with different vol % of graphene in accordance with certain embodiments described herein. FIG. 20 shows the thermal conductivity of silver epoxy/graphene composite with 0.5 vol %, 1.5 vol % and 2.5 vol % of graphene content respectively. The thermal conductivity of these samples increases monotonically with temperature over the investigated temperature range, which was chosen within the typical operating temperature of the silver epoxy. This K-T dependence is consistent with the general trend for highly disordered dielectric materials. See, e.g., M.-T. Hung et al., *Appl. Phys. Lett.* 2006, 89, 023117. Scattering of phonons at the surfaces of graphene flakes and silver grains may also increase the suppression of heat conduction.

Electrical properties were also studied on these composites using 2-probe resistivity measurements (Signatone and HP4142). The electrical resistivity of pristine silver epoxy was measured to be ~$10^{-4}$ ohm-m. In these examples, the electrical resistivity did not change much with addition of graphene. This may be attributed to epoxy itself being highly conductive and so, graphene flakes do not enhance it any further. However, on the other hand, it is interesting that even by increasing the number of interfaces by incorporation of graphene, the electrical properties are not affected.

Compatibility with Current Technology

Thermal interface materials (TIMs) can be an essential part of an assembly and are introduced to fill the air gaps thereby reducing the contact resistance between the heat-generating and heat-sinking units. To improve the heat dissipation across the interface, high thermal conductivity of TIM is often desired. Metallic TIMs are widely used for electronics packaging owing to their high thermal conductivity and minimum material thickness at given temperature and pressure. See, e.g., D. L. Saums, "Developments with metallic thermal interface materials," *Electronics Cooling, May* 2007, p. 1-6. Much industry and academic attention is focused to further enhance the thermal conductivity of TIMs by incorporation of high thermally conductive materials including CNTs and graphene nanoplatelets as fillers. See, e.g., W. E. Jones Jr. et al. *Materials* 2010, 3, 1478 and A. Yu, et al., *Journal of Physical Chemistry C* 2007, 111, 7565.

As disclosed herein, incorporation of graphene as a filler material into the readily used metallic TIM matrix can remarkably enhance the thermal conductivity of these TIMs at low-volume loading. With the recent advances in mass production of graphene at low cost, certain embodiments of the method can be used to produce high thermal conductive metallic/graphene thermal interface materials. Further thermal conductivity enhancement of graphene-metallic TIMs can be possible by improving the interfacial bonding between the graphene and silver particles in the epoxy.

Thus, certain embodiments as disclosed herein further enhance the thermal conductivity of metallic thermal interface materials by incorporation of graphene fillers into the matrix. A significant increase in thermal conductivity value of metallic TIM-epoxy has been experimentally demonstrated. The composite thermal conductivity increases to 10 W/mK by incorporation of 2.5 vol % of graphene which is equivalent to an increase of ~500% as compared to the thermal conductivity of 1.67 W/mK of the pristine silver epoxy. The thermal conductivity enhancement in certain embodiments can be attributed to the very high thermal conductivity of graphene and its planar geometry which can translate into reduced thermal boundary resistance between the graphene-matrix interfaces. As disclosed herein, graphene offers an economical solution for the development of high thermal conductivity TIMs for electronics packaging.

Part C: Thermal Management of Batteries

Lithium-ion (Li-ion) batteries are attractive alternatives to other types of batteries owing to their high-energy storage density and competitive cost. However, Li-ion batteries generate significant heat during the high-power discharge. The self-heating shortens the battery life-time and poses a safety hazard. Advances in laptop computer technologies put additional demands on the battery power sources. Li-ion batteries provide high energy density at relatively low cost but are limited in application because of the strong self-heating effects coupled with the adverse effect of temperature on the battery life-time. See, e.g., P. Ramadass et al., *J. Power Sources*, 112, 614-620 (2002).

The laptop battery packs utilize multiple Li-ion cells, which are stored close together to provide high electric power. This arrangement can lead to increased temperatures that degrade the battery life. See, e.g., H. Maleki and A. Shamsuri, Thermal analysis and modeling of a notebook computer battery, *J. Power Sources* 115, 131-136 (2003). Traditional cooling systems, which use air-cooling with an electric fan, are not attractive solutions due to their bulkiness and additional power requirements. The situation with the high-power Li-ion batteries used in the electric cars is even more severe in terms of thermal management.

Prior work on thermal issues in Li-ion battery packs has demonstrated that a passive thermal management system, which uses a phase change material (PCM) is a promising approach. See, e.g., S. A. Khateeb et al., *J. Power Sources* 128, 292-307 (2004). The PCM thermal management uses the latent heat stored in the material as its phase changes over a small temperature range. See, e.g., M. M. Farid et al., A review on phase change energy storage: materials and applications, *Energy Convers. Manage.* 45, 1597-1615 (2004). However, PCMs typically have low thermal conductivity. They store heat from the batteries rather than transfer it outside. For this reason, the usefulness of PCM passive thermal management for the high-power Li-ion batteries is limited.

Figure 21:
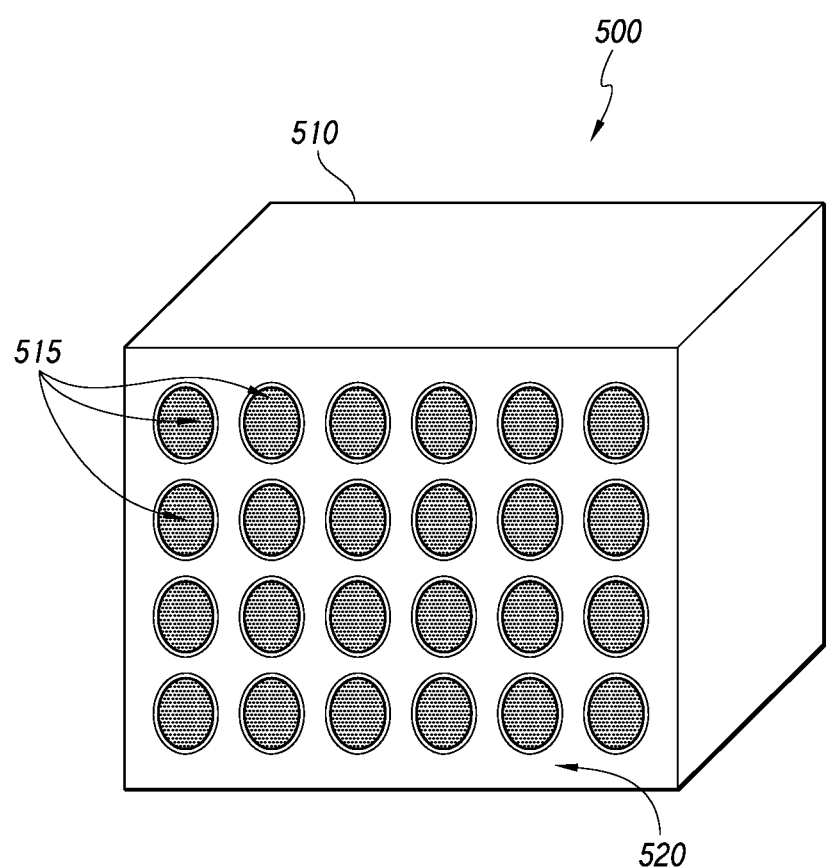
FIG. 21 is a schematic of an example of Li-ion batteries inside the battery pack in accordance with certain embodiments described herein. The space between the battery cylinders can be filled not with phase change materials (PCM) but with the graphene-based TIMs.

Certain embodiments disclosed herein uses a regular battery pack with Li-ion or other types of batteries. FIG. 21 is a schematic of an example of Li-ion batteries inside the battery pack in accordance with certain embodiments described herein. The space between the battery cylinders can be filled not with conventional PCM but with the graphene-based TIMs. In certain embodiments, the method of thermal management is changed from the storing the heat in PCM surrounding the batteries to fast transfer of heat from batteries to the outside heat spreaders or environment. The viscosity and low-cost of our graphene-MLG TIMs can allow for filling the entire volume of the pack.

Accordingly, as shown in FIG. 21, certain embodiments include a battery 500 configured to transfer heat outside the battery 500. The battery 500 can include a battery pack 510 and graphene-based thermal interface material 520. In some embodiments, the battery pack 510 can include Li-ion cells 515. Furthermore, in some embodiments, the graphene-based thermal interface material 520 can include the thermal interface materials 100 or 300 as disclosed herein. The graphene-based thermal interface material 520 can be manufactured by the methods 200 or 400 as disclosed herein. In further embodiments, the battery can include thermal phase change material. For example, the thermal phase change material can be a graphene-based thermal phase change material. In various embodiments, the battery 500 can be manufactured by filling the battery pack 510 with graphene-based thermal interface materials 520 or thermal phase change materials (e.g., graphene-based thermal phase change materials).

Although the foregoing description has shown, described, and pointed out the fundamental novel features of the present teachings, it will be understood that various omissions, substitutions, and changes in the form of the detail of each apparatus, method, or use as illustrated, may be made by those skilled in the art, without departing from the scope of the present teachings. Consequently, the scope of the present teachings should not be limited to the foregoing discussion.

What is claimed is:

1. A thermal interface material comprising:
   a matrix; and
   a filler comprising graphene and multilayer graphene disposed within the matrix, wherein at least about 50% of the multilayer graphene has a thickness greater than 0.35 nm and less than or equal to about 1.5 nm, wherein about 10% of the multilayer graphene has a lateral dimension greater than 1 micrometer and less than or equal to about 10 micrometers, and wherein about 90% of the multilayer graphene has a lateral dimension within the range of about 25 nanometers to about 1 micrometer.

2. The thermal interface material of claim 1, wherein the thermal interface material comprises between about 0.5 volume percent to about 25 volume percent of graphene and multilayer graphene.

3. The thermal interface material of claim 2, wherein the matrix comprises epoxy.

4. The thermal interface material of claim 3, wherein the thermal interface material has a thermal conductivity of at least about 2 W/mK at room temperature.

5. The thermal interface material of claim 4, wherein the thermal interface material has a thermal conductivity within the range of about 2 W/mK to about 10 W/mK at room temperature.

6. The thermal interface material of claim 3, wherein the thermal interface material has a thermal conductivity enhancement of at least about 150% at room temperature.

7. The thermal interface material of claim 6, wherein the thermal interface material has a thermal conductivity enhancement within the range of about 150% to about 2500% at room temperature.

8. The thermal interface material of claim 2, wherein the matrix comprises thermal grease.

9. The thermal interface material of claim 8, wherein the thermal interface material has a thermal conductivity of at least about 10 W/mK at room temperature.

10. The thermal interface material of claim 9, wherein the thermal interface material has a thermal conductivity within the range of about 10 W/mK to about 30 W/mK at room temperature.

11. The thermal interface material of claim 1, wherein at least about 10% of the multilayer graphene has a thickness less than or equal to about 1 nanometer.

12. The thermal interface material of claim 1, wherein the matrix comprises a polymer.

13. A method of manufacturing the thermal interface material of claim 1, the method comprising:
providing graphite in a liquid solution;
ultrasonicating the solution;
centrifuging the ultrasonicated solution;
filtering the centrifuged solution;
forming the filler comprising graphene and multilayer graphene from the centrifuged solution; and
adding the filler with the matrix to form the thermal interface material.

14. The method of claim 13, wherein forming the filler comprises:
drying the filtered solution to form a suspension;
dispersing the suspension in a liquid;
ultrasonicating the liquid; and
drying the liquid.

15. The method of claim 14, wherein at least one of drying the filtered solution or drying the liquid comprises drying in a vacuum oven.

16. The method of claim 14, wherein dispersing the suspension comprises dispersing the suspension in water.

17. The method of claim 13, wherein providing graphite in a liquid solution comprises providing graphite powders in an aqueous solution of sodium cholate.

18. The method of claim 13, wherein ultrasonicating comprises ultrasonicating between about 10 hours and about 15 hours.

19. The method of claim 13, wherein centrifuging comprises centrifuging at a centrifugation rate between about 5 K-rpm and about 20 K-rpm.

20. The method of claim 13,
wherein the filtering the centrifuged solution comprises decanting the upper layer of the centrifuged solution, and
wherein forming the filler comprises forming the filler from the decanted layers.

21. The method of claim 13, wherein adding the filler comprises:
mixing the filler with a matrix material that forms into the matrix; and
heating the mixed matrix material.

22. A battery configured to transfer heat outside the battery, the battery comprising:
a battery pack comprising Li-ion cells; and
the thermal interface material of claim 1.

23. The battery of claim 22, further comprising thermal phase-change material.

24. A method of using graphene-based thermal interface materials for thermal management of a battery pack, the method comprising filling the battery pack with the thermal interface material of claim 1.

25. The method of claim 24, further comprising filling the battery pack with thermal phase change materials.

26. The thermal interface material of claim 1, further comprising:
a metallic filler.

27. The thermal interface material of claim 26, wherein the matrix comprises a phase change material.

28. The thermal interface material of claim 26, wherein the matrix comprises epoxy.

29. The thermal interface material of claim 26, wherein the thermal conductivity is within a range of about 2 W/mK to about 15 W/mK at room temperature.

30. The thermal interface material of claim 29, wherein the thermal conductivity remains within the range of about 2 W/mK to about 15 W/mK for temperatures between about 5° C. and about 75° C.

31. A method of manufacturing the thermal interface material of claim 26, the method comprising:
providing a liquid graphene solution;
dispersing the solution into a matrix material comprising metal particles;
heating the matrix material to form the thermal interface material.

32. The method of claim 31, wherein dispersing the solution into the matrix material comprises dispersing the solution ultrasonically in an epoxy loaded with the metal particles.

33. The method of claim 32, wherein after dispersing the solution into the matrix material, the method further comprising:
adding a hardener to the solution; and
high shear mixing the solution.

34. The method of claim 32, wherein heating the matrix material cures the epoxy.

35. The method of claim 32, wherein heating removes remaining solvent and air bubbles.

36. A battery configured to transfer heat outside the battery, the battery comprising:
a battery pack comprising Li-ion cells; and
the thermal interface material of claim 26.

37. The battery of claim 36, further comprising thermal phase-change material.

38. A method of using graphene-based thermal interface materials for thermal management of a battery pack, the method comprising filling the battery pack with the thermal interface material of claim 26.

39. The method of claim 38, further comprising filling the battery pack with thermal phase change materials.

40. The thermal interface material of claim 26, wherein the metallic filler comprises microscopic silver particles.

* * * * *